(12) United States Patent
Goergen et al.

(10) Patent No.: US 12,413,315 B2
(45) Date of Patent: Sep. 9, 2025

(54) POWER DELIVERY THROUGH AN OPTICAL SYSTEM

(71) Applicant: Cisco Technology, Inc., San Jose, CA (US)

(72) Inventors: Joel Richard Goergen, Soulsbyville, CA (US); D. Brice Achkir, Livermore, CA (US); Chad M. Jones, Doylestown, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 529 days.

(21) Appl. No.: 17/849,236

(22) Filed: Jun. 24, 2022

(65) Prior Publication Data

US 2022/0329327 A1 Oct. 13, 2022

Related U.S. Application Data

(60) Division of application No. 16/746,660, filed on Jan. 17, 2020, now Pat. No. 11,431,420, which is a
(Continued)

(51) Int. Cl.
*H04B 10/80* (2013.01)
*G02B 6/42* (2006.01)
(Continued)

(52) U.S. Cl.
CPC ......... *H04B 10/807* (2013.01); *G02B 6/4293* (2013.01); *H02J 50/30* (2016.02); *H02J 50/80* (2016.02); *H04L 12/10* (2013.01); *H04L 12/12* (2013.01); *H04L 12/40045* (2013.01); *H04L 12/40091* (2013.01); *H04L 12/40176* (2013.01);
(Continued)

(58) Field of Classification Search
None
See application file for complete search history.

(56) References Cited

U.S. PATENT DOCUMENTS 3,335,324 A 8/1967 Buckeridge
4,811,187 A 3/1989 Nakajima
(Continued)

FOREIGN PATENT DOCUMENTS

CN 1209880 C 7/2005
CN 201689347 U 12/2010
(Continued)

OTHER PUBLICATIONS

"FiberOptic," Fischer Connectors, retrieved from the Internet Dec. 21, 2017, 5 pages; https://www.fischerconnectors.com/us/en/products/fiberoptic.
(Continued)

*Primary Examiner* — David W Lambert

(57) ABSTRACT

An apparatus includes a connector for coupling a cable comprising at least one optical fiber and at least one electrical wire to an optical module at a network communications device, the connector comprising an electrical contact plate for engagement with an electrical contact on the optical module, and a ferrule for receiving the at least one optical fiber. The electrical contact plate is configured for electrically coupling the at least one electrical wire to the electrical contact on the optical module for delivery of power through the optical module.

20 Claims, 26 Drawing Sheets

Related U.S. Application Data continuation-in-part of application No. 16/601,153, filed on Oct. 14, 2019, now Pat. No. 11,212,013, which is a continuation of application No. 15/707,976, filed on Sep. 18, 2017, now Pat. No. 10,541,758.

(51) Int. Cl.
  H02J 50/30 (2016.01)
  H02J 50/80 (2016.01)
  H04L 12/10 (2006.01)
  H04L 12/12 (2006.01)
  H04L 12/40 (2006.01)
  H04M 19/08 (2006.01)
  G01J 3/02 (2006.01)
  G02B 6/38 (2006.01)
  H02S 40/38 (2014.01)

(52) U.S. Cl.
  CPC ........... *H04M 19/08* (2013.01); *G01J 3/0218* (2013.01); *G02B 6/3817* (2013.01); *H02S 40/38* (2014.12)

(56) References Cited

U.S. PATENT DOCUMENTS

| | | | |
|---|---|---|---|
| 4,986,625 A * | 1/1991 | Yamada | G02B 6/4292 385/55 |
| 5,652,893 A | 7/1997 | Ben-Meir | |
| 6,008,631 A | 12/1999 | Johari | |
| 6,220,955 B1 | 4/2001 | Posa | |
| 6,259,745 B1 | 7/2001 | Chan | |
| 6,636,538 B1 | 10/2003 | Stephens | |
| 6,685,364 B1 | 2/2004 | Brezina | |
| 6,784,790 B1 | 8/2004 | Lester | |
| 6,826,368 B1 | 11/2004 | Koren | |
| 6,855,881 B2 | 2/2005 | Khoshnood | |
| 6,860,004 B2 | 3/2005 | Hirano | |
| 7,325,150 B2 | 1/2008 | Lehr | |
| 7,420,355 B2 | 9/2008 | Liu | |
| 7,490,996 B2 | 2/2009 | Sommer | |
| 7,492,059 B2 | 2/2009 | Peker | |
| 7,509,505 B2 | 3/2009 | Randall | |
| 7,566,987 B2 | 7/2009 | Black et al. | |
| 7,583,703 B2 | 9/2009 | Bowser | |
| 7,589,435 B2 | 9/2009 | Metsker | |
| 7,593,747 B1 | 9/2009 | Karam | |
| 7,603,570 B2 | 10/2009 | Schindler | |
| 7,616,465 B1 | 11/2009 | Vinciarelli | |
| 7,813,646 B2 | 10/2010 | Furey | |
| 7,835,389 B2 | 11/2010 | Yu | |
| 7,854,634 B2 | 12/2010 | Filipon | |
| 7,881,072 B2 | 2/2011 | DiBene | |
| 7,915,761 B1 | 3/2011 | Jones | |
| 7,921,307 B2 | 4/2011 | Karam | |
| 7,924,579 B2 | 4/2011 | Arduini | |
| 7,940,787 B2 | 5/2011 | Karam | |
| 7,973,538 B2 | 7/2011 | Karam | |
| 8,020,043 B2 | 9/2011 | Karam | |
| 8,035,973 B2 | 10/2011 | McColloch | |
| 8,037,324 B2 | 10/2011 | Hussain | |
| 8,068,937 B2 | 11/2011 | Eaves | |
| 8,081,589 B1 | 12/2011 | Gilbrech | |
| 8,184,525 B2 | 5/2012 | Karam | |
| 8,276,397 B1 | 10/2012 | Carlson | |
| 8,279,883 B2 | 10/2012 | Diab | |
| 8,310,089 B2 | 11/2012 | Schindler | |
| 8,319,627 B2 | 11/2012 | Chan | |
| 8,345,439 B1 | 1/2013 | Goergen | |
| 8,350,538 B2 | 1/2013 | Cuk | |
| 8,358,893 B1 | 1/2013 | Sanderson | |
| 8,386,820 B2 | 2/2013 | Diab | |
| 8,638,008 B2 | 1/2014 | Baldwin et al. | |
| 8,700,923 B2 | 4/2014 | Fung | |
| 8,712,324 B2 | 4/2014 | Corbridge | |
| 8,750,710 B1 | 6/2014 | Hirt | |
| 8,768,528 B2 | 7/2014 | Millar et al. | |
| 8,781,637 B2 | 7/2014 | Eaves | |
| 8,787,775 B2 | 7/2014 | Earnshaw | |
| 8,829,917 B1 | 9/2014 | Lo | |
| 8,836,228 B2 | 9/2014 | Xu | |
| 8,842,430 B2 | 9/2014 | Hellriegel | |
| 8,849,471 B2 | 9/2014 | Daniel | |
| 8,966,747 B2 | 3/2015 | Vinciarelli | |
| 9,019,895 B2 | 4/2015 | Li | |
| 9,024,473 B2 | 5/2015 | Huff | |
| 9,184,795 B2 | 11/2015 | Eaves | |
| 9,189,036 B2 | 11/2015 | Ghoshal | |
| 9,189,043 B2 | 11/2015 | Vorenkamp | |
| 9,273,906 B2 | 3/2016 | Goth | |
| 9,319,101 B2 | 4/2016 | Lontka | |
| 9,321,362 B2 | 4/2016 | Woo | |
| 9,373,963 B2 | 6/2016 | Kuznelsov | |
| 9,419,436 B2 | 8/2016 | Eaves | |
| 9,484,771 B2 | 11/2016 | Braylovskly | |
| 9,510,479 B2 | 11/2016 | Vos | |
| 9,531,551 B2 | 12/2016 | Balasubramanian | |
| 9,590,811 B2 | 3/2017 | Hunter, Jr. | |
| 9,618,714 B2 | 4/2017 | Murray | |
| 9,640,998 B2 | 5/2017 | Dawson | |
| 9,651,751 B1 | 5/2017 | Ding et al. | |
| 9,665,148 B2 | 5/2017 | Hamdi | |
| 9,693,244 B2 | 6/2017 | Maruhashi | |
| 9,734,940 B1 | 8/2017 | McNutt | |
| 9,853,689 B2 | 12/2017 | Eaves | |
| 9,874,930 B2 | 1/2018 | Vavilala | |
| 9,882,656 B2 | 1/2018 | Sipes, Jr. | |
| 9,893,521 B2 | 2/2018 | Lowe | |
| 9,948,198 B2 | 4/2018 | Imai | |
| 9,979,370 B2 | 5/2018 | Xu | |
| 9,985,600 B2 | 5/2018 | Xu | |
| 10,007,628 B2 | 6/2018 | Pitigoi-Aron | |
| 10,028,417 B2 | 7/2018 | Schmidtke | |
| 10,128,764 B1 | 11/2018 | Vinciarelli | |
| 10,248,178 B2 | 4/2019 | Brooks | |
| 10,263,526 B2 | 4/2019 | Sandusky et al. | |
| 10,407,995 B2 | 9/2019 | Moeny | |
| 10,439,432 B2 | 10/2019 | Eckhardt | |
| 10,468,879 B2 | 11/2019 | Eaves | |
| 10,541,543 B2 | 1/2020 | Eaves | |
| 10,714,930 B1 | 7/2020 | Weiss et al. | |
| 10,735,105 B2 | 8/2020 | Goergen et al. | |
| 11,838,060 B2 | 12/2023 | Goergen et al. | |
| 2001/0024373 A1 | 9/2001 | Cuk | |
| 2002/0126967 A1 | 9/2002 | Panak | |
| 2004/0000816 A1 | 1/2004 | Khoshnood | |
| 2004/0033076 A1 | 2/2004 | Song | |
| 2004/0043651 A1 | 3/2004 | Bain | |
| 2004/0073703 A1 | 4/2004 | Boucher | |
| 2004/0208590 A1 | 10/2004 | Nabors et al. | |
| 2004/0223768 A1 | 11/2004 | Shastri et al. | |
| 2004/0264214 A1 | 12/2004 | Xu | |
| 2005/0197018 A1 | 9/2005 | Lord | |
| 2005/0268120 A1 | 12/2005 | Schindler | |
| 2006/0202109 A1 | 9/2006 | Delcher | |
| 2006/0209875 A1 | 9/2006 | Lum | |
| 2006/0268898 A1 | 11/2006 | Karam | |
| 2007/0041732 A1 | 2/2007 | Oki et al. | |
| 2007/0103168 A1 | 5/2007 | Batten | |
| 2007/0236853 A1 | 10/2007 | Crawley | |
| 2007/0263675 A1 | 11/2007 | Lum | |
| 2007/0284941 A1 | 12/2007 | Robbins | |
| 2007/0284946 A1 | 12/2007 | Robbins | |
| 2007/0288125 A1 | 12/2007 | Quaratiello | |
| 2007/0288771 A1 | 12/2007 | Robbins | |
| 2008/0063399 A1 | 3/2008 | Mallya et al. | |
| 2008/0198635 A1 | 8/2008 | Hussain | |
| 2008/0229120 A1 | 9/2008 | Diab | |
| 2008/0310067 A1 | 12/2008 | Diab | |
| 2010/0077239 A1 | 3/2010 | Diab | |
| 2010/0117808 A1 | 5/2010 | Karam | |
| 2010/0171602 A1 | 7/2010 | Kabbara | |
| 2010/0190384 A1 | 7/2010 | Lanni | |
| 2010/0237846 A1 | 9/2010 | Vetteth | |

(56) References Cited

U.S. PATENT DOCUMENTS

| | | |
|---|---|---|
| 2010/0290190 A1 | 11/2010 | Chester |
| 2011/0004773 A1 | 1/2011 | Hussain |
| 2011/0007664 A1 | 1/2011 | Diab |
| 2011/0057612 A1 | 3/2011 | Taguchi |
| 2011/0083824 A1 | 4/2011 | Rogers |
| 2011/0181436 A1 | 7/2011 | Davey et al. |
| 2011/0228578 A1 | 9/2011 | Serpa |
| 2011/0266867 A1 | 11/2011 | Schindler et al. |
| 2011/0290497 A1 | 12/2011 | Stenevik |
| 2012/0043935 A1 | 2/2012 | Dyer |
| 2012/0064745 A1 | 3/2012 | Ottliczky |
| 2012/0170927 A1 | 7/2012 | Huang |
| 2012/0177381 A1 | 7/2012 | Dobbelaere et al. |
| 2012/0201089 A1 | 8/2012 | Barth |
| 2012/0231654 A1 | 9/2012 | Conrad |
| 2012/0287984 A1 | 11/2012 | Lee |
| 2012/0317426 A1 | 12/2012 | Hunter, Jr. |
| 2012/0319468 A1 | 12/2012 | Schneider |
| 2013/0077923 A1 | 3/2013 | Peeters Weem et al. |
| 2013/0079633 A1 | 3/2013 | Peeters Weem et al. |
| 2013/0103220 A1 | 4/2013 | Eaves |
| 2013/0249292 A1 | 9/2013 | Blackwell, Jr. |
| 2013/0272721 A1 | 10/2013 | Van Veen |
| 2013/0329344 A1 | 12/2013 | Tucker |
| 2014/0111180 A1 | 4/2014 | Vladan |
| 2014/0126151 A1 | 5/2014 | Campbell |
| 2014/0129850 A1 | 5/2014 | Paul |
| 2014/0258742 A1 | 9/2014 | Chien |
| 2014/0265550 A1 | 9/2014 | Milligan |
| 2014/0372773 A1 | 12/2014 | Heath |
| 2015/0078740 A1 | 3/2015 | Sipes, Jr. |
| 2015/0106539 A1 | 4/2015 | Leinonen |
| 2015/0115741 A1 | 4/2015 | Dawson |
| 2015/0215001 A1 | 7/2015 | Eaves |
| 2015/0215131 A1 | 7/2015 | Paul |
| 2015/0304742 A1 | 10/2015 | Siddhaye et al. |
| 2015/0333918 A1 | 11/2015 | White, III |
| 2015/0340818 A1 | 11/2015 | Scherer |
| 2015/0365003 A1 | 12/2015 | Sadwick |
| 2016/0018252 A1 | 1/2016 | Hanson |
| 2016/0020911 A1 | 1/2016 | Sipes, Jr. |
| 2016/0064938 A1 | 3/2016 | Balasubramanian |
| 2016/0111877 A1 | 4/2016 | Eaves |
| 2016/0118784 A1 | 4/2016 | Saxena |
| 2016/0133355 A1 | 5/2016 | Glew |
| 2016/0134331 A1 | 5/2016 | Eaves |
| 2016/0142217 A1 | 5/2016 | Gardner |
| 2016/0188427 A1 | 6/2016 | Chandrashekar |
| 2016/0197600 A1 | 7/2016 | Kuznetsov |
| 2016/0241148 A1 | 8/2016 | Kizilyalli |
| 2016/0262288 A1 | 9/2016 | Chainer |
| 2016/0273722 A1 | 9/2016 | Crenshaw |
| 2016/0294500 A1 | 10/2016 | Chawgo |
| 2016/0294568 A1 | 10/2016 | Chawgo et al. |
| 2016/0308683 A1 | 10/2016 | Pischl |
| 2016/0352535 A1 | 12/2016 | Hiscock |
| 2016/0365967 A1 | 12/2016 | Tu et al. |
| 2017/0041152 A1 | 2/2017 | Sheffield |
| 2017/0041153 A1 | 2/2017 | Picard |
| 2017/0054296 A1 | 2/2017 | Daniel |
| 2017/0110871 A1 | 4/2017 | Foster |
| 2017/0117971 A1 | 4/2017 | Sipes, Jr. |
| 2017/0123466 A1 | 5/2017 | Carnevale |
| 2017/0146260 A1 | 5/2017 | Ribbich |
| 2017/0155517 A1 | 6/2017 | Cao |
| 2017/0155518 A1 | 6/2017 | Yang |
| 2017/0164525 A1 | 6/2017 | Chapel |
| 2017/0214236 A1 | 7/2017 | Eaves |
| 2017/0229886 A1 | 8/2017 | Eaves |
| 2017/0234738 A1 | 8/2017 | Ross |
| 2017/0244318 A1 | 8/2017 | Giuliano |
| 2017/0248976 A1 | 8/2017 | Moller |
| 2017/0294966 A1 | 10/2017 | Jia |
| 2017/0325320 A1 | 11/2017 | Wendt |
| 2018/0024964 A1 | 1/2018 | Mao |
| 2018/0053313 A1 | 2/2018 | Smith |
| 2018/0054083 A1 | 2/2018 | Hick |
| 2018/0060269 A1 | 3/2018 | Kessler |
| 2018/0088648 A1 | 3/2018 | Otani |
| 2018/0098201 A1 | 4/2018 | Torello |
| 2018/0102604 A1 | 4/2018 | Keith |
| 2018/0123360 A1 | 5/2018 | Eaves |
| 2018/0159430 A1 | 6/2018 | Albert |
| 2018/0188712 A1 | 7/2018 | MacKay |
| 2018/0191513 A1 | 7/2018 | Hess |
| 2018/0254624 A1 | 9/2018 | Son |
| 2018/0313886 A1 | 11/2018 | Mlyniec |
| 2019/0267804 A1 | 8/2019 | Matan |
| 2019/0280895 A1 | 9/2019 | Mather |
| 2020/0228001 A1 | 7/2020 | Lambert |
| 2020/0233472 A1 | 7/2020 | Jones et al. |
| 2020/0295955 A1 | 9/2020 | O'Brien et al. |
| 2022/0190587 A1 | 6/2022 | Eaves et al. |

FOREIGN PATENT DOCUMENTS

| | | |
|---|---|---|
| CN | 104412541 A | 3/2015 |
| CN | 204836199 U | 12/2015 |
| CN | 205544597 | 8/2016 |
| CN | 205544597 U | 8/2016 |
| CN | 104081237 B | 10/2016 |
| CN | 104412541 B | 5/2019 |
| EP | 1936861 | 6/2008 |
| EP | 2120443 | 11/2009 |
| EP | 2693688 | 2/2014 |
| EP | 3759869 | 1/2021 |
| EP | 3766208 | 1/2021 |
| EP | 3777051 | 2/2021 |
| EP | 3788743 | 3/2021 |
| JP | S62232608 | 10/1987 |
| JP | 2001177031 | 6/2001 |
| JP | 2009058547 | 3/2009 |
| JP | 2009106127 | 5/2009 |
| JP | 2016533652 | 10/2016 |
| WO | 9316407 A1 | 8/1993 |
| WO | WO199316407 A1 | 8/1993 |
| WO | 2006127916 A2 | 11/2006 |
| WO | WO2010053542 | 5/2010 |
| WO | WO2017054030 | 4/2017 |
| WO | WO2017167926 A1 | 10/2017 |
| WO | WO2018017544 A1 | 1/2018 |
| WO | WO2019023731 A1 | 2/2019 |
| WO | 2019055318 A1 | 3/2019 |

OTHER PUBLICATIONS

"TFOCA GenX Hybrid 2x2 Fiber Optic—Copper Connector," Stran Technologies, http://www.strantech.com/products/tfoca-genx-hybrid-2x2-fiber-optic-copper-connector, retrieved from the Internet Dec. 21, 2017, 2 pages.

"E-Link Hybrid Connector," QPC Fiber, http://www.qpcfiber.com/product/connectors/e-link-hybrid-connector, retrieved from the Internet Dec. 21, 2017, 4 pages.

"Power Over Fiber," Lumentu, https://www.lumentum.com/sites/default/files/technical-library-items/poweroverfiber-tn-pv-ae_0.pdf, retrieved from the Internet Dec. 21, 2017, 8 pages.

"Network Remote Power Using Packet Energy Transfer", Eaves et al., www.voltserver.com, Sep. 2012, 5 pages.

Product Overview, "Pluribus VirtualWire Solution", Pluribus Networks, PN-PO-VWS-05818, https://www.pluribusnetworks.com/assets/Pluribus-VirtualWire-PO-50918.pdf, May 2018, 5 pages.

Implementation Guide, "Virtual Chassis Technology Best Practices", Juniper Networks, 8010018-009-EN, Jan. 2016, https://www.juniper.net/us/en/local/pdf/implementation-guides/8010018-en.pdf, 29 pages.

Yencheck, et al., "Thermal Modeling of Portable Power Cables," Report of Investigations, RI 9463, 1993, 24 pages.

Zhang, et la., "Machine Learning-Based Temperature Prediction for Runtime Thermal Management across System Components," IEEE Transactions of Parallel and Distribute, vol. XX, No. YY, Mar. 2016, 15 pages.

(56) References Cited

OTHER PUBLICATIONS

"Data Center Power Equipment Thermal Guidelines and Best Practices," ASHRAE Technical Comittee, Whitepaper, 2016, 60 pages.
Adapa, et al., "Dynamic Thermal Rating of Substation Terminal Equipment," Cigre, B3-108, 2004, 8 pages.
Chen, Real-Time Termperature Estimation for Power MOSEFETs Conidering Thermal Aging Effects:, IEEE Trnasactions on Device and Materials Reliability, vol. 14, No. 1, Mar. 2014, 9 pages.
Jingquan Chen et al.: "Buck-boost PWM converters having two independently controlled switches", 32nd Annual EEE Power Electronics Specialists Conference. PESC 2001. Conference Proceedings, Vancouver, Canada, Jun. 17-21, 2001; [Annual Power Electronics Specialists Conference], New York, NY: IEEE, US, vol. 2,Jun. 17, 2001 (Jun. 17, 2001), pp. 736-741, XP010559317, DOI: 10.1109/PESC.2001.954206, ISBN 978-0-7803-7067-8 paragraph [SectionII]; figure 3.
Cheng K W E et al: "Constant Frequency, Two-Stage Quasiresonant Convertor", IEE Proceedings B. Electrical Power Applications, 1271980 1, vol. 139, No. 3, May 1, 1992 (May 1, 1992), pp. 227-237, XP000292493, the whole document.
Petition for Post Grant Review of U.S. Pat. No. 10,735,105 [Public], filed Feb. 16, 2021, PGR 2021-00055.
Petition for Post Grant Review of U.S. Pat. No. 10,735,105 [Public], filed Feb. 16, 2021, PGR 2021-00056.
Eaves, S. S., "Network Remote Powering Using Packet Energy Transfer, Proceedings of IEEE International Conference on Telecommunications Energy (INTELEC) 2012, Scottsdale, AZ, Sep. 30-Oct. 4, 2012 (IEEE 2012) ("EavesIEEE').
Edelstein S., Updated 2016 Tesla Model S also gets new 75-kWhbattery option, (Jun. 19, 2016), archived Jun. 19, 2016 by Internet Archive Wayback machine at https://web.archive.org/web/20160619001148/https://www.greencarreports.com/news/1103 782_updated-2016-tesla-model-s-also-gets-new-7 5-kwh-battery-option ("Edelstein").
NFPA 70 National Electrical Code, 2017 Edition ("NEC").
International Standard IEC 62368-1 Edition 2.0 (2014), ISBN 978-2-8322-1405-3 ("IEC-62368").
International Standard IEC/TS 60479-1 Edition 4.0 (2005), ISBN 2-8318-8096-3 ("IEC-60479").
International Standard IEC 60950-1 Edition 2.2 (2013), ISBN 978-2-8322-0820-5 ("IEC-60950").
International Standard IEC 60947-1 Edition 5.0 (2014), ISBN 978-2-8322-1798-6 ("IEC-60947").
Tanenbaum, A. S., Computer Networks, Third Edition (1996) ("Tanenbaum").
Stallings, W., Data and Computer Communications, Fourth Edition ( 1994) ("Stallings").
Alexander, C. K., Fundamentals of Electric Circuits, Indian Edition (2013) ("Alexander").
Hall, S. H., High-Speed Digital System Design, A Handbook of Interconnect Theory and Design Practices (2000) ("Hall").
Bedra, A. S., Microelectronic Circuits, Seventh Edition (2014) ("Sedra").
Lathi, B. P., Modem Digital and Analog Communication Systems, Fourth Edition (2009) ("Lathi").
Understanding 802.3at PoE Plus Standard Increases Available Power (Jun. 2011) ("Microsemi").
Office Action in counterpart Chinese Application No. 201880059993.6, mailed Dec. 17, 2021, 28 pages.
Office Action in counterpart European Application No. 18780270.7, mailed Feb. 11, 2022, 7 pages.
English Translation of Office Action in counterpart Chinese Application No. 201880059993.6, mailed Jun. 17, 2021, 14 pages.
First Examination Report in counterpart Indian Application No. 202047005685, mailed Aug. 3, 2021, 6 pages.
English Translation of Office Action in counterpart Chinese Application No. 201880059993.6, mailed Sep. 23, 2022, 7 pages.
International Preliminary Report on Patentability for International Application No. PCT/US2018/050055, mailed Apr. 2, 2020, 9 Pages.
International Search Report and Written Opinion for International Application No. PCT/US2018/050055, mailed Nov. 26, 2018, 12 Pages.
Extended European Search Report for counterpart European Application No. 24160388.5, dated Jun. 19, 2024, 11 pages.
*Voltserver Inc.*, v. *Cisco Technology, Inc.*, "Decision Denying Institution of Post-Grant Review," United States Patent and Trademark Office, PGR2021-00055, U.S. Pat. No. 10,735,105 B2, Aug. 19, 2021, 25 pages.
*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00055, U.S. Pat. No. 10,735,105, 2021, Jun. 2, 2021, 51 pages.
"Effects of current on human beings and livestok—Part 1: General aspects," Technical Specification, Basic Safety Publication, IEC/TS 60479-1, Edition 4.0, Jul. 2005, 122 pages.
"Information technology equipment—Safety—Part 1: General requirements," International Standard, IEC 60950-1, Edition 2.2, May 2013, pp. 1-61, 63 pages.
"Information technology equipment—Safety—Part 1: General requirements," International Standard, IEC 60950-1, Edition 2.2, May 2013, pp. 62-122, 61 pages.
"Information technology equipment—Safety—Part 1: General requirements," International Standard, IEC 60950-1, Edition 2.2, May 2013, pp. 123-181, 59 pages.
"Information technology equipment—Safety—Part 1: General requirements," International Standard, IEC 60950-1, Edition 2.2, May 2013, pp. 182-253, 72 pages.
"Information technology equipment—Safety—Part 1: General requirements," International Standard, IEC 60950-1, Edition 2.2, May 2013, pp. 254-319, 66 pages.
"Information technology equipment—Safety—Part 1: General requirements," International Standard, IEC 60950-1, Edition 2.2, May 2013, pp. 320-377, 58 pages.
"Information technology equipment—Safety—Part 1: General requirements," International Standard, IEC 60950-1, Edition 2.2, May 2013, pp. 378-433, 56 pages.
"Information technology equipment—Safety—Part 1: General requirements," International Standard, IEC 60950-1, Edition 2.2, May 2013, pp. 434-490, 57 pages.
"Information technology equipment—Safety—Part 1: General requirements," International Standard, IEC 60950-1, Edition 2.2, May 2013, pp. 491-551, 61 pages.
"Information technology equipment—Safety—Part 1: General requirements," International Standard, IEC 60950-1, Edition 2.2, May 2013, pp. 552-622, 71 pages.
"Information technology equipment—Safety—Part 1: General requirements," International Standard, IEC 60950-1, Edition 2.2, May 2013, pp. 623-644, 24 pages.
"Low-voltage switchgear and controlgear—Part 1: General rules," International Standard, Amendment 2, IEC 60947-1, Edition 5.0, Sep. 2014, pp. 1-63, 65 pages.
"Low-voltage switchgear and controlgear—Part 1: General rules," International Standard, Amendment 2, IEC 60947-1, Edition 5.0, Sep. 2014, pp. 64-102, 41 pages.
Stephen Edelstein, "Updated 2016 Tesla Model S also gets new 75-kWhbattery option," Internet Archive WayBack Machine, Green Car Reports, May 5, 2016, 3 pages.
Stephen S. Eaves, "Network Remote Powering using Packet Energy Transfer," IEEE Xplore, Proceedings of IEEE International Conference on Telecommunications Energy (INTELEC) 2012, 978-1-4673-1000, Sep. 30-Oct. 4, 2012, 4 pages.
"Audio/video, information and communication technology equipment—Part 1: Safety requirements," International Standard, IEC 62368-1, Edition 2.0, Feb. 2014, pp. 1-132, 134 pages.
"Audio/video, information and communication technology equipment—Part 1: Safety requirements," International Standard, IEC 62368-1, Edition 2.0, Feb. 2014, pp. 133-263, 131 pages.

(56) References Cited

OTHER PUBLICATIONS

"Audio/video, information and communication technology equipment—Part 1: Safety requirements," International Standard, IEC 62368-1, Edition 2.0, Feb. 2014, pp. 264-387, 124 pages.
"Audio/video, information and communication technology equipment—Part 1: Safety requirements," International Standard, IEC 62368-1, Edition 2.0, Feb. 2014, pp. 388-508, 121 pages.
"Audio/video, information and communication technology equipment—Part 1: Safety requirements," International Standard, IEC 62368-1, Edition 2.0, Feb. 2014, pp. 509-593, 85 pages.
"Audio/video, information and communication technology equipment—Part 1: Safety requirements," International Standard, IEC 62368-1, Edition 2.0, Feb. 2014, pp. 594-676, 85 pages.
"National Electrical Code," National Fire Protection Association (NFPA) 70, 2017, 881 pages.
*Voltserver Inc.*, v. *Cisco Technology, Inc.*, "Declaration of David A. Durfee, Ph.D.," United States Patent and Trademark Office, PGR2021-00055, U.S. Pat. No. 10,735,105, Feb. 16, 2021, 340 pages.
David A. Durfee Ph.D., "Curriculum Vitae," 4 pages.
Adel S. Sedra, "Microelectronic Circuits," Sedra/Smith, Oxford University Press, Seventh Edition, 2015, 38 pages.
Charles k. Alexander, et al., "Fundamentals of Electric Circuits," McGraw Hill Education, Indian Edition 5e, 2013, 37 pages.
Andrew S. Tanenbaum, "Computer Networks," Prentice Hall PTR, Third Edition, 1996, 12 pages.
William Stallings, "Data and Computer Communications," Macmillan Publishing Company, Fourth Edition, 1994, 14 pages.
B.P. Lathi, et al., "Modern Digital and Analog Communication Systems," Oxford University Press, Fourth Edition, 2009, 15 pages.
*Voltserver Inc.*, v. *Cisco Technology, Inc.*, "Petition for Post Grant Review of U.S. Pat. No. 10,735,105," United States Patent and Trademark Office, PGR2021-00055, U.S. Pat. No. 10,735,105, Feb. 16, 2021, 132 pages.
Stephen H. Hall, et al., "High-Speed Digital System Design: A handbook of Interconnect Theory and Design Practices," , John Wiley & Sons, Inc., 2000, 55 pages.
"Understanding 802.3at, PoE Plus Standard Increases Available Power," Microsemi, Jun. 2011, 7 pages.
"Digital Electricity Gen2 Detailed Installation Manual," Voltserver Digital Electricity, Rev B.1, Nov. 29, 2017, 68 pages.
Berkeley Lab ETA, "Touch-Safe, High Voltage Digital Electricity Transmission using Packet Energy Transfer," Vimeo, https://vimeo.com/172469008, Mar. 8, 2016, 8 pages.
*Voltserver Inc.*, v. *Cisco Technology, Inc.*, "Decision Denying Institution of Post-Grant Review," United States Patent and Trademark Office, PGR2021-00056, U.S. Pat. No. 10,735,105 B2, Aug. 23, 2021, 18 pages.
*Voltserver Inc.*, v. *Cisco Systems, Inc.*, "Patent Owner's Preliminary Response to Post Grant Review Under 35 U.S.C. § 312 and 37 C.F.R. § 42.107," United States Patent and Trademark Office, PGR2021-00056, U.S. Pat. No. 10,735,105, 2021, Jun. 2, 2021, 46 pages.
*Voltserver Inc.*, v. *Cisco Technology, Inc.*, "Declaration of Stephens S. Eaves," United States Patent and Trademark Office, PGR2021-00056, U.S. Pat. No. 10,735,105, Feb. 16, 2021, 7 pages.
"Electrical—Computer Conference Proceedings," Internet Archive WayBack Machine Search for Intelec 2012, Curran Associates, Inc., http://www.proceedings.com/electrical-computer-proceedings.html, 2012, 125 pages.
"Part VII: A Summary of Commonly Used MARC 21 Fields," Marc, Understanding MARC, https://www.loc.gov/marc//umb/um07to10.html, retrieved from Internet Feb. 13, 2021, 17 pages.
LC Catalog-Browse, https://catalog.loc.gov/vwebv/searchBrowse, retrieved from the Internet Feb. 12, 2021, 1 page.
"International Telecommunications Energy Conference: [proceedings] (Marc Tags)," Library Catalog, https://catalog.loc.gov/vwebv/staffView?searchId=3877&recPointer=0&recCount=25&searchType=1&bibId=11348322, retrieved from the Internet Feb. 12, 2021, 3 pages.
*Voltserver Inc.*, v. *Cisco Technology, Inc.*, "Petition for Post Grant Review of U.S. Pat. No. 10,735,105," United States Patent and Trademark Office, PGR2021-00056, U.S. Pat. No. 10,735,105, Feb. 16, 2021, 116 pages.
"International Telecommunications Energy Conference: [proceedings] (Full Record)," Library Catalog, https://catalog.loc.gov/vwebv/holdingsInfo?searchId=3810&recPointer=0&recCount=25&searchType=1&bibId=11348322, retrieved from the Internet Feb. 12, 2021, 4 pages.
Office Action in Japanese Patent Application No. 2020515928, mailed Mar. 24, 2023, 6 pages.

\* cited by examiner

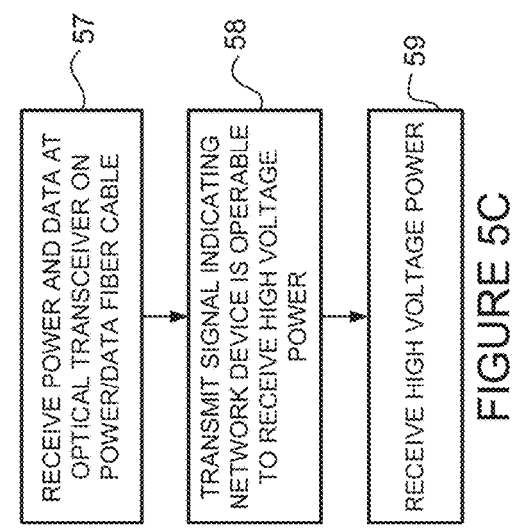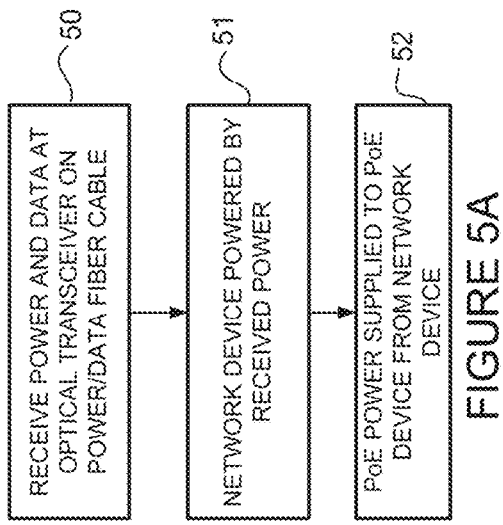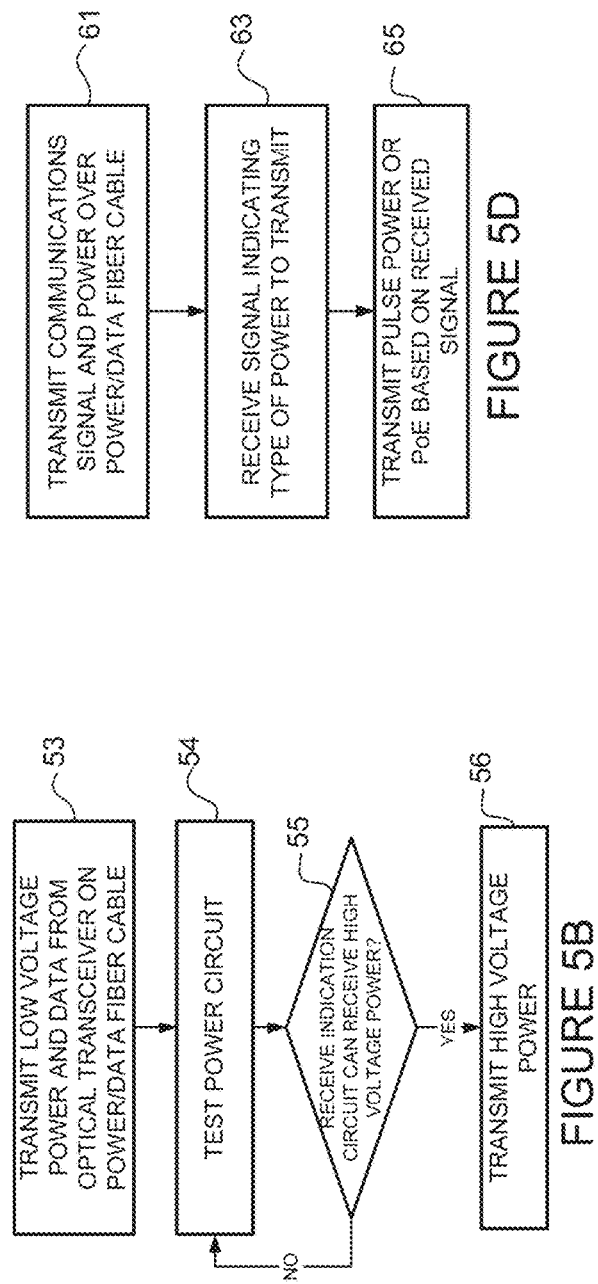

POWER DELIVERY THROUGH AN OPTICAL SYSTEM

STATEMENT OF RELATED APPLICATIONS

The present application is a divisional application of U.S. patent application Ser. No. 16/746,660, entitled POWER DELIVERY THROUGH AN OPTICAL SYSTEM, filed Jan. 17, 2020 (now U.S. Pat. No. 11,431,420), which is a continuation-in-part of U.S. patent application Ser. No. 16/601,153, entitled POWER DELIVERY THROUGH AN OPTICAL SYSTEM, filed Oct. 14, 2019 (now U.S. Pat. No. 11,212,013), which is a continuation of U.S. patent application Ser. No. 15/707,976, entitled POWER DELIVERY THROUGH AN OPTICAL SYSTEM, filed Sep. 18, 2017 (now U.S. Pat. No. 10,541,758). These applications are incorporated herein by reference in their entireties.

TECHNICAL FIELD

The present disclosure relates generally to communications networks, and more particularly, to power delivery in a communications network.

BACKGROUND

Power over Ethernet (PoE) is a technology for providing electrical power over a wired telecommunications network from power sourcing equipment (PSE) to a powered device (PD) over a link section. In conventional PoE systems, power is delivered over the cables used by the data over a range from a few meters to about one hundred meters. When a greater distance is needed or fiber optic cables are used, power must be supplied through a local power source such as a wall outlet due to limitations with conventional PoE. Furthermore, today's PoE systems have limited power capacity, which may be inadequate for many classes of devices.

BRIEF DESCRIPTION OF THE DRAWINGS

FIG. 5A is a flowchart illustrating an overview of a process for receiving power and data at an optical transceiver and powering a network device, in accordance with one embodiment.

FIG. 5B is a flowchart illustrating an overview of a process for transmitting high voltage power from an optical transceiver, in accordance with one embodiment.

FIG. 5C is a flowchart illustrating an overview of a process for receiving power and data at an optical transceiver, in accordance with one embodiment.

FIG. 5D is a flowchart illustrating an overview of a process for transmitting power and data, in accordance with one embodiment.

Corresponding reference characters indicate corresponding parts throughout the several views of the drawings.

DESCRIPTION OF EXAMPLE EMBODIMENTS

Overview

Figure 1:
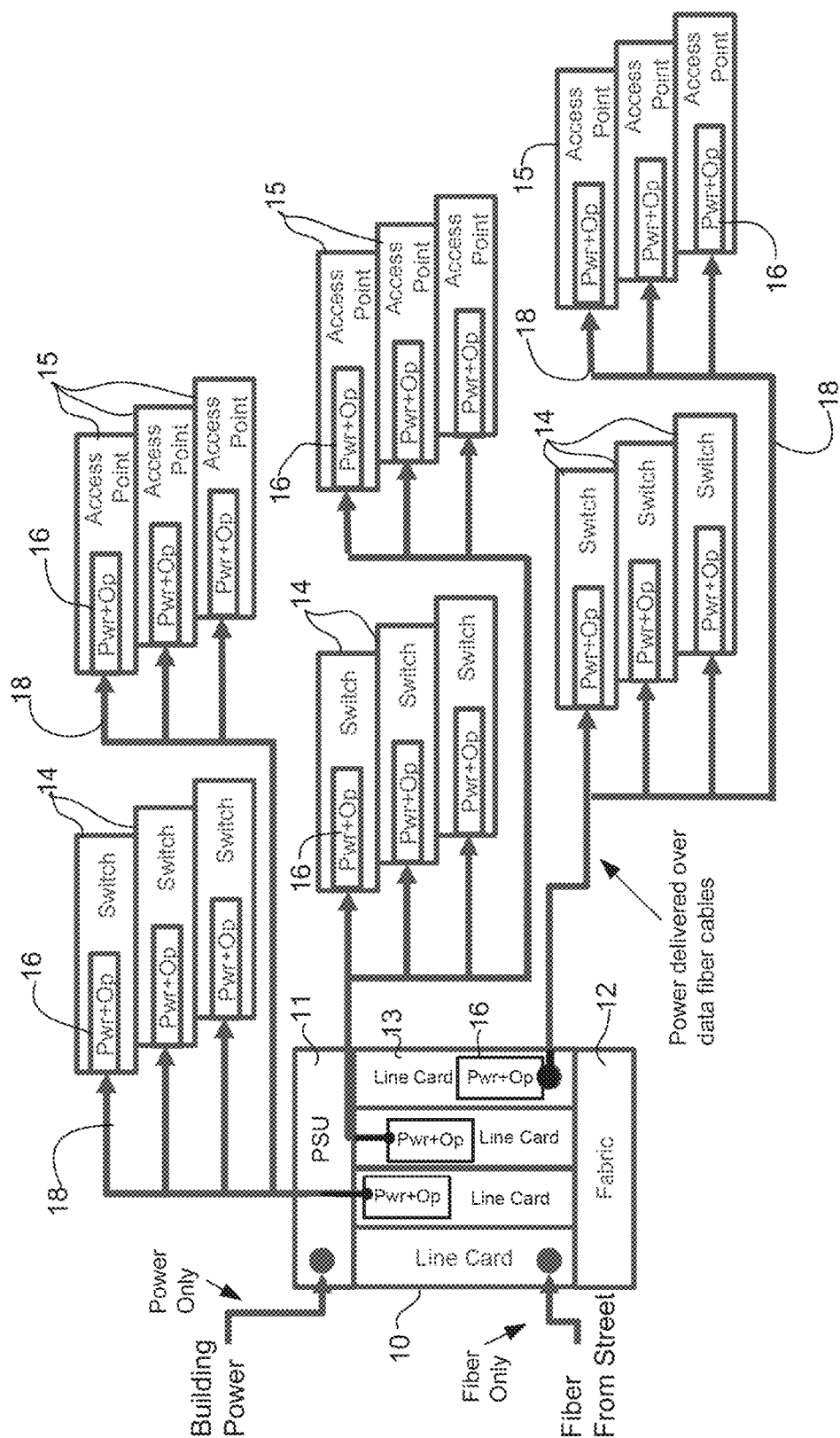
FIG. 1 illustrates an example of a network in which embodiments described herein may be implemented.

In one or more embodiments, an apparatus generally comprises a connector for coupling a cable comprising at least one optical fiber and at least one electrical wire to an optical module at a network communications device, the connector comprising an electrical contact plate for engagement with an electrical contact on the optical module, and a ferrule for receiving the at least one optical fiber. The electrical contact plate is configured for electrically coupling the at least one electrical wire to the electrical contact on the optical module for delivery of power through the optical module.

In one or more embodiments, the connector is operable to deliver pulse power from the at least one electrical wire to the electrical contact or from the electrical contact to the at least one electrical wire.

In one or more embodiments, the connector further comprises a crimp point for crimping the at least one electrical wire to the electrical contact plate.

In one or more embodiments, the connector comprises a plurality of electrical contact plates for engagement with a plurality of electrical contacts on the optical module, and wherein the electrical contact plates are configured for electrically coupling electrical wires in the cable to the electrical contacts on the optical module for delivering multi-phase pulse power.

In one or more embodiments, the electrical contact plates comprise a plurality of copper pads, each of the copper pads positioned on a different external side wall of the connector.

In one or more embodiments, the connector comprises three electrical contact plates for engagement with three electrical contacts on the optical module, and wherein the electrical contact plates are configured for electrically coupling electrical wires in the cable to the electrical contacts on the optical module for delivering three-phase pulse power.

In one or more embodiments, the electrical contact plates are positioned on three of four sides of the connector, a fourth side of the connector comprising a latch mechanism for securing the connector in the optical module.

In one or more embodiments, the connector further comprises a spring loaded slide cover for covering the electrical contact plate, and wherein the optical module comprises a post for moving the slide cover and exposing the electrical contact plate when the connector is inserted into the optical module.

In one or more embodiments, the power comprises pulse power comprising a plurality of voltage pulses defining alternating high voltage states and low voltage states (e.g., alternating between different voltage level states).

In one or more embodiments, the electrical wire comprises at least two electrical wires and the power comprises at least two phases with the voltage pulses offset between phases to provide continuous power.

In one or more embodiments, the apparatus further comprises the optical module comprising an opening for receiving the connector, wherein an end of the optical module opposite the opening comprises a power connector for transferring the power to or from the network communications device and an electrical signal interface for transmitting or receiving data.

In one or more embodiments, the apparatus further comprises the cable, wherein the at least one electrical wire is crimped on to the electrical contact plate and the at least one optical fiber is inserted into the ferrule.

In another embodiment, an apparatus generally comprises a substrate, a die mounted on the substrate, at least one photonic chip in communication with the die, and at least one electrical device for receiving or transmitting pulse power. The photonic chip is configured for connection with at least one optical fiber in a power and optical fiber cable and the electrical device is configured for connection with at least one electrical wire in the power and optical fiber cable.

In yet another embodiment, a method generally comprises transmitting power from an electrical component of an optical transceiver and communications from an optical component of the optical transceiver over a cable comprising at least one optical fiber and at least one electrical wire. The power is transmitted as pulse power comprising a plurality of voltage pulses defining alternating high voltage states and low voltage states.

Further understanding of the features and advantages of the embodiments described herein may be realized by reference to the remaining portions of the specification and the attached drawings.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

In conventional Power over Ethernet (PoE) systems used to simultaneously transmit power and data communications, power is delivered over the same twisted pair cable used for data. These systems are limited in range to a few meters to about 100 meters. Furthermore, the maximum power delivery capacity of standard PoE is approximately 100 W (Watts), but many classes of powered devices would benefit from power delivery of 1000 W or more. When a larger distance is needed, fiber optic cabling is used, or larger power delivery ratings are needed, power needs to be supplied to the device through a local power source.

The embodiments described herein provide power delivery through an optical system by supplying power integrated with fiber cabling over the same fiber/optical transceiver system so that power may be supplied at greater distances (e.g., up to 10 km), in greater quantity (e.g., up to several kilowatts), and may be provided in locations where local power is difficult to deliver. By incorporating power in the fiber cable and delivering from a building entrance, power does not need to be supplied throughout a data center room and a full zoned system may be deployed without building out a data room. The embodiments effectively deliver communications and power on a sufficiently large scale that equipment in a data room can entirely be powered from an equipment/premise entrance point of the building. Thus, electrical power distribution equipment may be removed from the floor data room and switches, routers, access points, lighting systems, and other electronic devices or equipment may be placed outside of the approximately 100 m (meter) range of traditional PoE systems. Through use of a modified optical transceiver and connector system, power can be delivered to equipment in a zone, data room on a floor, or an access point anywhere in the building.

Internet of Things (IoT) applications such as remote sensors/actuators and fog computing may also take advantage of the greater reach and power delivery capacity of the system described herein. With an extended reach (e.g., one to ten km), all power to communications equipment throughout a building or across a neighborhood can be delivered from one source, along with the communications link for the equipment, thereby providing a user with complete control of the location of communications equipment without the 100 m limitation of traditional PoE. As described in detail below, one or more embodiments may be used to deliver power to and from a network (e.g., switch/router) system using an optical transceiver and fiber connector system modified to incorporate electrical wires to deliver power through the optical transceiver and to powered devices. The system may be referred to as PoE+Fiber (PoE+F), Power+Fiber, or ESP (Extended Safe Power).

In one or more embodiments, the cables may deliver power at a power level higher than used in conventional PoE. For example, power may be delivered at a power level greater than 100 W and in some cases greater than 1000 W. In one or more embodiments, power may be delivered as pulse power (also referred to as "pulsed power"). The term "pulse power" (or "pulsed power") as used herein refers to power that is delivered in a sequence of pulses (alternating low direct current voltage state and high direct current voltage state) in which the voltage varies between a very small voltage (e.g., close to 0V (volts), 3V) during a pulse-off interval and a larger voltage (e.g., >12V, >24V) during a pulse-on interval. High voltage pulse power (e.g., >56V, >60V, >300V, —380V) may be transmitted from power sourcing equipment (PSE) to a powered device (PD) for use in powering the powered device, as described, for example, in U.S. patent application Ser. No. 16/671,508 ("Initialization and Synchronization for Pulse Power in a Network System"), filed Nov. 1, 2019, which is incorporated herein by reference in its entirety.

In one or more embodiments, the pulse power may be transmitted in multiple phases in a multi-phase pulse power system. For example, one or more embodiments may use multiple phase (multi-phase) pulse power to achieve less loss, with continuous uninterrupted power to the output with overlapping phase pulses to a powered device, as described in U.S. patent application Ser. No. 16/380,954 ("Multiple Phase Pulse Power in a Network Communications System"), filed Apr. 10, 2019, which is incorporated herein by reference in its entirety. As described in detail below, multiple phases of voltage pulses may be delivered over a multi-phase cable with the pulses in each phase offset from pulses in other phases to provide continuous power. Multiple pair cabling may be used, for example, with a DC pulse on each pair, timed in such a manner as to provide approximately 100% net duty cycle continuous power at the powered device (or load).

Referring now to the drawings, and first to FIG. 1, an example of a network in which embodiments described herein may be implemented is shown. For simplification, only a small number of nodes are shown. The embodiments operate in the context of a data communications network including multiple network devices. The network may include any number of network devices in communication via any number of nodes (e.g., routers, switches, gateways, controllers, access points, or other network devices), which facilitate passage of data within the network. The network devices may communicate over or be in communication with one or more networks (e.g., local area network (LAN), metropolitan area network (MAN), wide area network (WAN), virtual private network (VPN) (e.g., Ethernet virtual private network (EVPN), layer 2 virtual private network (L2VPN)), virtual local area network (VLAN), wireless network, enterprise network, corporate network, data center, Internet of Things (IoT), Internet, intranet, or any other network).

The network is configured to pass electrical power along with optical data to provide both data connectivity and electric power to network devices such as switches, routers, access points, or other electronic components and devices. Signals may be exchanged among communications equipment and power transmitted from power sourcing equipment to powered devices. As described in detail below, the system delivers power to and from a network (e.g., switch/router system) using an optical transceiver (optical module, optical system) configured to receive and transmit both data and electrical power, and a cabling system comprising both optical fibers and electrical wires (e.g., copper wires).

It is to be understood that the term "optical fiber" as used herein refers to any optical media that can be used for carrying light.

In one or more embodiments, the network may be configured for Power over Ethernet (PoE), Power over Fiber (PoF), advanced power over data, ESP (Extended Safe Power) (e.g., delivery of pulse power with fault detection and safety protection), multi-phase pulse power, or any other power over communications cable system that is used to pass electric power along with data to allow a single cable to provide both data connectivity (optical data, electrical data, or both optical and electrical data) and electric power to network devices such as switches, routers, wireless access points, IP (Internet Protocol) cameras, VoIP (Voice over IP) phones, video cameras, point-of-sale devices, security access control devices, residential devices, building automation, industrial automation, and many other devices.

As shown in the example of FIG. 1, the system uses building power supplied to a network device 10, which may be located in a premise/entry room, for example. The power may be transmitted from the building entry point to end points, which may be located at distances greater than 100 m (e.g., 1 km, 10 km, or any other distance), and/or at greater power levels than 100 W (e.g., 250 W, 1000 W or any other power level). In one or more embodiments, there is no need for additional electrical wiring for the communications network and all of the network communications devices 14, 15 operate using the power provided by the system, delivered through an optical transceiver 16 operable to receive and transmit both fiber optics data and power.

The network device 10 comprises one or more power supply units (PSUs) 11 for receiving power (e.g., building power), a fabric 12, and a plurality of line cards 13. Input power (e.g., AC, HVAC, HVDC, line card 48-56 VDC) may be provided at the PSE. In the example shown in FIG. 1, one of the line cards receives fiber from outside of the building (e.g., from street or other location) and the other line cards implement power delivery through the optical system. The network device 10 is operable to provide high capacity power from an internal power system (e.g., one or more PSU providing over and including 100 W (e.g., 250 W, 500 W, 1000 W, 2000 W, 5000 W, 10 kW, 12 kW, 14 kW, 16 kW) or any other suitable power capacity. The power may be transmitted from the PSE 10 to end points (PDs) 12, which may be located at distances up to 1000 m, for example, and at power levels greater than 50 W. The PSU 11 may provide, for example, PoE, ESP (e.g., pulse power, multi-phase pulse power), or AC power. As described in detail below, the network device 10 is operable to receive power external from a communications network and transmit the power over data fiber cables 18 in the communications network (e.g., network comprising central hub 10 (PSE) and a plurality of network devices 14, 15 (PDs)). The network device 10 may comprise, for example, a router or convergence device (e.g., Network Convergence System (NCS) 4000 series available from Cisco Systems, Inc.) or any other suitable line card system. It is to be understood that this is only an example and any other network device operable to transmit power and optical data may be used. As shown in FIG. 1, one or more of the line cards 13 may include an optical transceiver module 16 operable to transmit power and data on the cables 18.

Data may be exchanged among communications equipment on one or more optical fibers and power transmitted from the PSE 10 to the PDs 14, 15 on one or more wire or wire pair within the cable 18. As previously noted, the electrical wire may also be used to exchange signals (e.g., control data). Data (signals) (optical or electrical) may be transmitted from the PSE 10 to the PD 14, 15, from the PD to the PSE, or in both directions (bidirectional communications from the PSE to the PD and from the PD to the PSE). Bidirectional communications may be transmitted over the optical fibers or wires. For example, one or more electrical wires in the cable 18 may be used to transmit control data comprising pulse power switch control data (e.g., isolation switch synchronization, modulator switch control data), bidirectional control data, or other PSE/PD synchronization data. In one example, 10 MB communications are provided over the copper wires during a high voltage pulse (pulse-on), low voltage (pulse-off), or both pulse-on and pulse-off on the high voltage data link. The cable 18 may comprise any number of optical fibers and wires or wire pairs for delivering data and power over various cable lengths.

The network may include any number or arrangement of network communications devices (e.g., switches 14, access points 15, routers, or other devices operable to route (switch, forward) data communications). In one example, each group of access points 15 is located on a different floor or zone. One or more network devices 14, 15 may also deliver power to equipment using PoE, as described below with respect to FIGS. 3 and 4. For example, one or more of the network devices 14, 15 may deliver power using PoE to electronic components such as IP (Internet Protocol) cameras, VoIP (Voice over IP) phones, video cameras, point-of-sale devices, security access control devices, residential devices, building automation devices, industrial automation, factory equipment, lights (building lights, streetlights), traffic signals, and many other electrical components and devices.

Cables 18 extending from the network device 10 to the switches 14 and access points 15 are configured to transmit power over data fiber cabling and include both optical fibers and electrical wires. The cables 18 may be formed from any material suitable to carry both electrical power and optical data (e.g., copper, fiber) and may carry any number of electrical wires and optical fibers in any arrangement. As described below with respect to FIGS. 15-17, the cables 18 may also include cooling.

The optical transceivers (optical module, optical device, optics module, network transceiver, silicon photonics optical transceiver, in-package optics, VCSEL (Vertical-Cavity Surface-Emitting Laser)) 16 are configured to source or receive power, as described in detail below. The optical transceiver 16 operates as an engine that bidirectionally converts optical signals to electrical signals or in general as an interface to the network element copper wire or optical fiber.

In one or more embodiments, the optical transceiver 16 may be a pluggable transceiver module in any form factor (e.g., SFP (Small Form-Factor Pluggable), QSFP (Quad Small Form-Factor Pluggable), CFP (C Form-Factor Pluggable), and the like), and may support data rates up to 400 Gbps, for example. Hosts for these pluggable optical modules include line cards on the switches 14, access points 15, or other network devices. One or more of the line cards 13 in network device 10 may also host optical modules. The host may include a printed circuit board (PCB) and electronic components and circuits operable to interface telecommunications lines in a telecommunications network. The host may be configured to perform one or more operations and receive any number or type of pluggable transceiver modules configured for transmitting and receiving signals.

In one or more embodiments, the optical transceiver (optical module) 16 may comprise a silicon photonics optical transceiver (in-package optics), as described below with respect to FIG. 24.

The optical transceiver 16 may also be configured for operation with AOC (Active Optical Cable) and form factors used in UWB (Ultra-Wideband) applications, including for example, Ultra HDMI (High-Definition Multimedia Interface), serial high bandwidth cables (e.g., thunderbolt), and other form factors.

Also, it may be noted that the optical transceivers 16 may be configured for operation in point-to-multipoint or multi-point-to-point topology. For example, QFSP may breakout to SFP+. One or more embodiments may be configured to allow for load shifting.

As described in detail below, in one or more embodiments, the optical transceiver 16 is modified along with a fiber connector system to incorporate copper wires to deliver power through the optical transceiver from the PSE 10 or to the powered devices 14, 15 for use by the network communications devices. The optical transceiver 16 provides for power to be delivered to the switches 14 and access points 15 in locations where standard power is not available. As described further below, the optical transceiver 16 may be configured to tap some of the energy and make intelligent decisions so that the power source 10 knows when it is safe to increase power on the wires without damaging the system or endangering an operator.

In one embodiment, one or more network devices may comprise dual-role power ports that may be selectively configurable to operate as a PSE (Power Source Equipment) port to provide power to a connected device or as a PD (Powered Device) port to sink power from the connected device, and enable the reversal of energy flow under system control, as described in U.S. Pat. No. 9,531,551 ("Dynamically Configurable Power-Over-Ethernet Apparatus and Method", issued Dec. 27, 2016), for example. The dual-role power ports may be PoE or PoE+F ports, for example.

In addition to the network devices 14, 15 comprising optical transceivers 16 operable to receive and transmit power over electrical wires and optical data over fibers, the network may also include one or more network devices comprising conventional optical modules that only process and transmit the optical data. These network devices would receive electrical power from a local power source such as a wall outlet. Similarly, specialized variants of transceivers 16 may eliminate the optical data interfaces, and only interconnect power (perhaps moving data interconnection to wireless networks).

Figure 2:
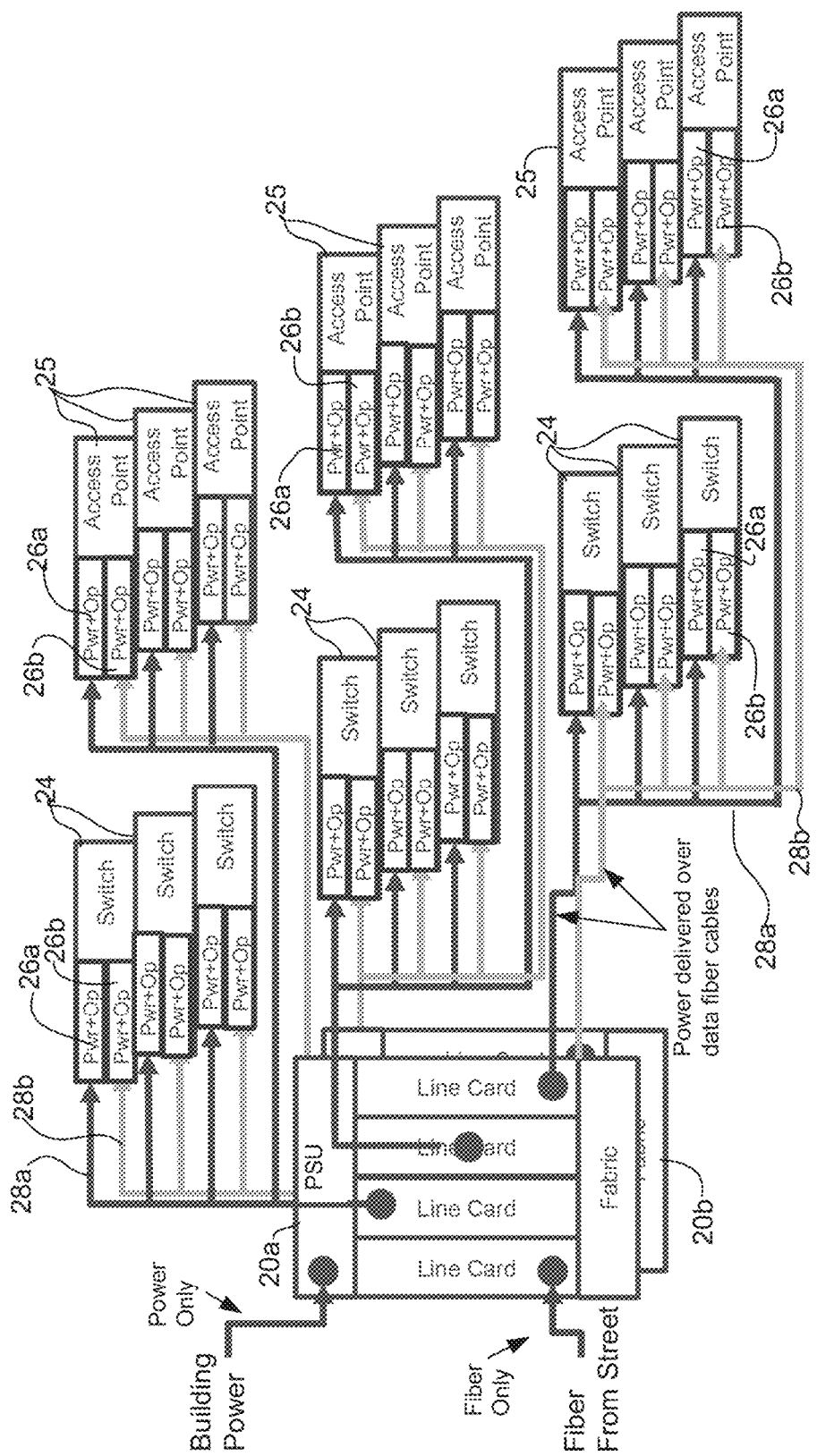
FIG. 2 illustrates an example of the network of FIG. 1 with redundant data and power.

FIG. 2 illustrates an example of a redundant data and power system. The network includes two redundant network devices 20a, 20b, which receive power and fiber at a premise entrance point, as previously described. Each network device 20a, 20b delivers power over data fiber cabling 28a, 28b, respectively, to the switches 24 and access points 25. Each switch 24 and access point 25 comprises two optical transceivers 26a, 26b for receiving data and power from network devices 20a, 20b, respectively. The network shown in the example of FIG. 2 may provide backup data and power in the case of failure of any single cable 28a, 28b, or either network device 20a, 20b, or provide additional power or bandwidth as needed in the network. In one example, a plurality of switches 24 and access points 25 may provide power and data to a first circuit and another group of switches and access points may provide power and data to a second circuit. Both circuits may be used to provide power to an equipment power circuit, for example, to provide higher service availability.

Figure 3:
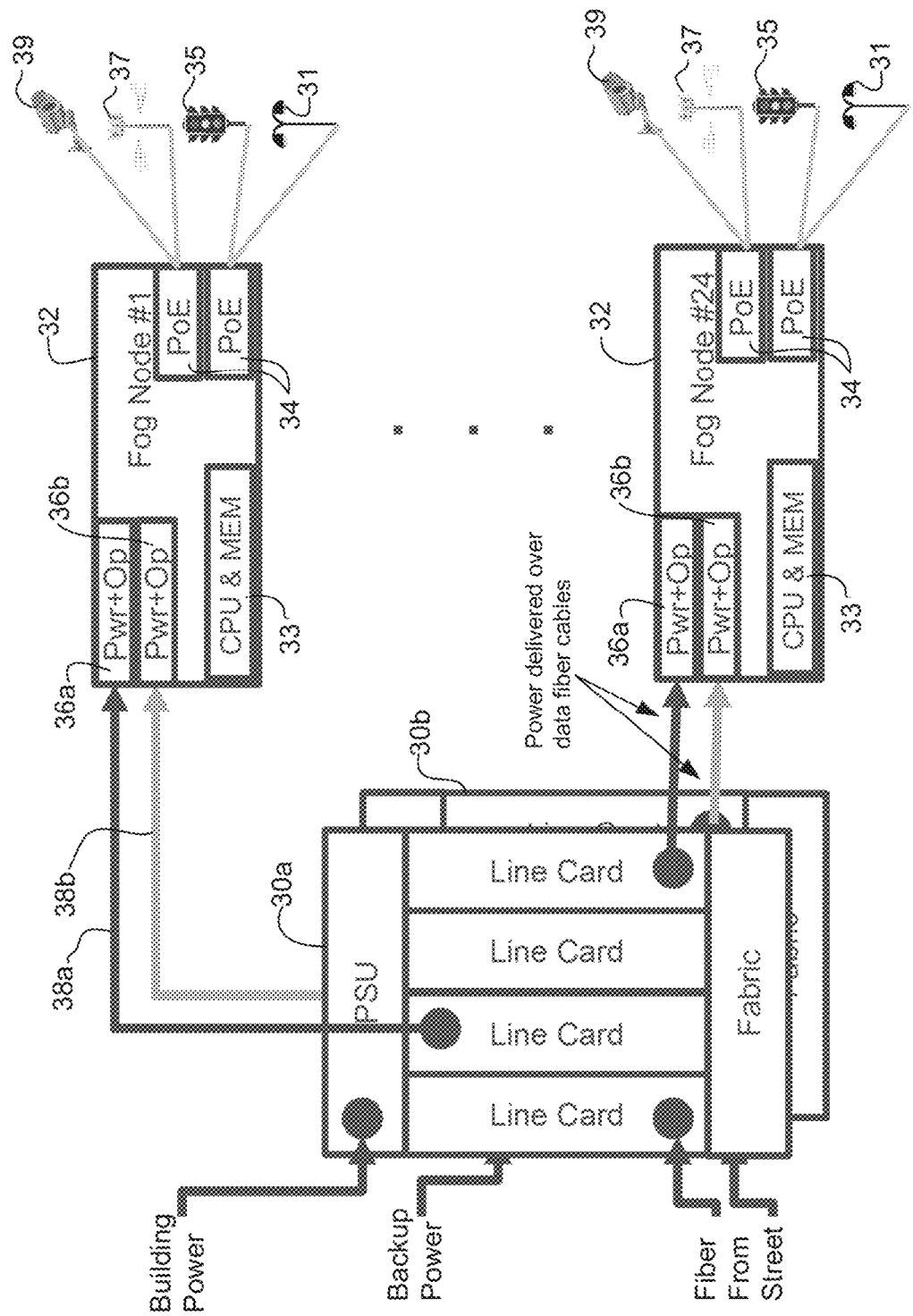
FIG. 3 illustrates an example of fog node deployment with the network of FIG. 2.

FIG. 3 illustrates an example of PoE+F (power and optics delivery) in a fog node deployment, in accordance with one embodiment. Fog is an IoT technique where computation, networking, and storage are moved from the cloud to locations much closer to the IoT sensors and actuators. In the example shown in FIG. 3, power is delivered over data fiber cables 38a, 38b connected to optical transceivers 36a, 36b. Each network device 30a, 30b provides power delivered over data fiber cabling 38a, 38b to any number of fog nodes 32. In one example, power may be delivered over data fiber cabling to provide approximately 600 W output to each of the twenty-four fog nodes 32. Each fog node 32 comprises processing and memory 33 and one or more PoE modules 34 operable to power one or more PoE devices. For example, each fog node 32 may provide approximately 500 W of power to PoE devices such as streetlights 31, traffic signals 35, 5G cells, access points, base stations 37, video cameras 39, or any other electronic device serving a smart building or smart city.

Figure 4:
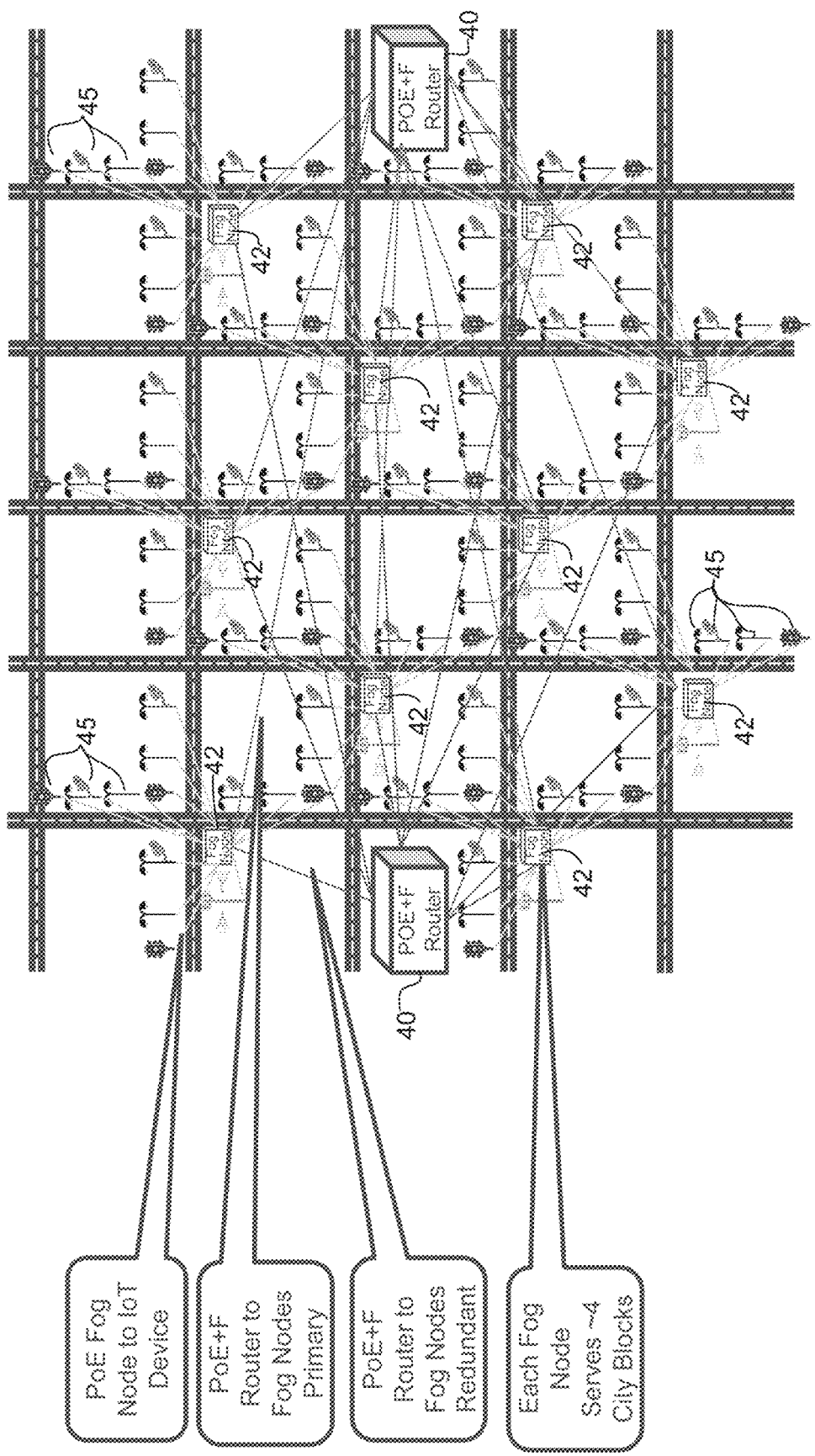
FIG. 4 illustrates an example of smart city fog deployment with the network of FIG. 3.

FIG. 4 illustrates an example of smart city fog deployment, in accordance with one embodiment. In this example, two PoE+F redundant routers 40 provide primary and backup (redundant) power and data to fog nodes 42. The fog nodes 42 provide power to one or more IoT (Internet of Things) devices 45 (e.g., 5G cells, APs, streetlights, traffic signals, video cameras, or other devices). In one example, each pair of routers 40 may serve approximately twenty-four fog nodes 42, covering approximately 100 city blocks or approximately 1 square km.

The PoE fog node arrangement shown in FIGS. 3 and 4 may also be used in a smart building (e.g., different fog node for each floor), smart factory (e.g., different fog node for each assembly cell), cruise ship, hotel, school, campus, hospital, shopping center, or any other environment.

It is to be understood that the network devices and topologies shown in FIGS. 1, 2, 3, and 4, and described above are only examples and the embodiments described herein may be implemented in networks comprising different network topologies or network devices, without departing from the scope of the embodiments. For example, the network may comprise any number or type of network communications devices that facilitate passage of data over the network (e.g., routers, switches, gateways, controllers), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, or other nodes interconnected to form a large and complex network, which may include cloud or fog computing. Nodes may be coupled to other nodes or networks through one or more interfaces employing any suitable wired or wireless connection, which provides a viable pathway for electronic communications.

FIGS. 5A-5D are flowcharts illustrating an overview of processes for delivery of power through an optical system (transmittal of power through optical transceiver). FIGS. 5A and 5C describe processes for receiving power at the optical transceiver and FIGS. 5B and 5D describe processes for transmitting power at the optical transceiver.

Referring first to FIG. 5A, power and data are received on a cable comprising one or more optical fibers and one or more electrical wires at an optical transceiver installed in a network communications device (step 50). As previously described, the power may be high voltage DC power, pulse power, or multi-phase pulse power. The optical transceiver (optical module, in-package optics) comprises an optical component and a power component (or power and electrical communications component). The optical transceiver 16 transmits power and data to the network communications device 14, which is powered by the power received at the optical transceiver (step 51) (FIGS. 1 and 5A). In one or more embodiments, the network communications device may further transmit PoE to one or more PoE devices (e.g., lights, access points, streetlights, traffic signals, cameras, or other IoT devices) (step 52).

FIG. 5B is a flowchart illustrating an overview of a process for transmitting high voltage power after testing a power circuit between the PSE 10 and PD 14 in accordance with one embodiment. At step 53, low voltage power and data are transmitted from an optical transceiver (e.g., optical module, in-package optics) installed in a central hub (e.g., central network device (PSE) 10 in FIG. 1) on power and data fiber cable 18 (cable comprising one or more optical fibers and one or more electrical wires). The PSE tests a power circuit between the PSE and PD (e.g., electrical wire (or wires) in cable 18) (step 54) and if the PSE receives an indication that the power circuit is operable to receive high voltage power (step 55), the PSE transmits high voltage power (e.g., high voltage pulse power, multi-phase pulse power) (step 56). If a message is not received from the PD, the PSE may continue to test (e.g., periodically) the power circuit. As described in detail below, after the PSE begins to transmit high voltage power, the PSE may continue to test the power circuit (e.g., during pulse-off time between high voltage pulses in pulse power).

FIG. 5C illustrates an overview of a process for receiving power and data on a power and data fiber cable, in accordance with one embodiment. At step 57, power and data are received at an optical transceiver (e.g., optical module, in-package optics) on a power and data fiber cable. The optical transceiver transmits a signal indicating that the network device is operable to receive high voltage power (step 58). High voltage power (e.g., pulse power, multi-phase pulse power) is received at the optical transceiver (step 59).

FIG. 5D illustrates an overview of a process for transmitting data and power over power and data fiber cable, in accordance with one embodiment. At step 61, the network communications device (e.g., central hub, PSE 10 in FIG. 1) transmits a communications signal and power over power and optical fiber cable (power/data fiber cable). The network device receives a signal indicating a type of power to transmit (step 63). The message (data, signal) may be received, for example, via an optical fiber or an electrical wire in the cable. In response to the message, the network device transmits one of pulse power or PoE (step 65).

It is to be understood that the processes shown in FIGS. 5A-5D are only examples and that steps may be added, removed, combined, or modified, without departing from the scope of the embodiments.

Figure 6:
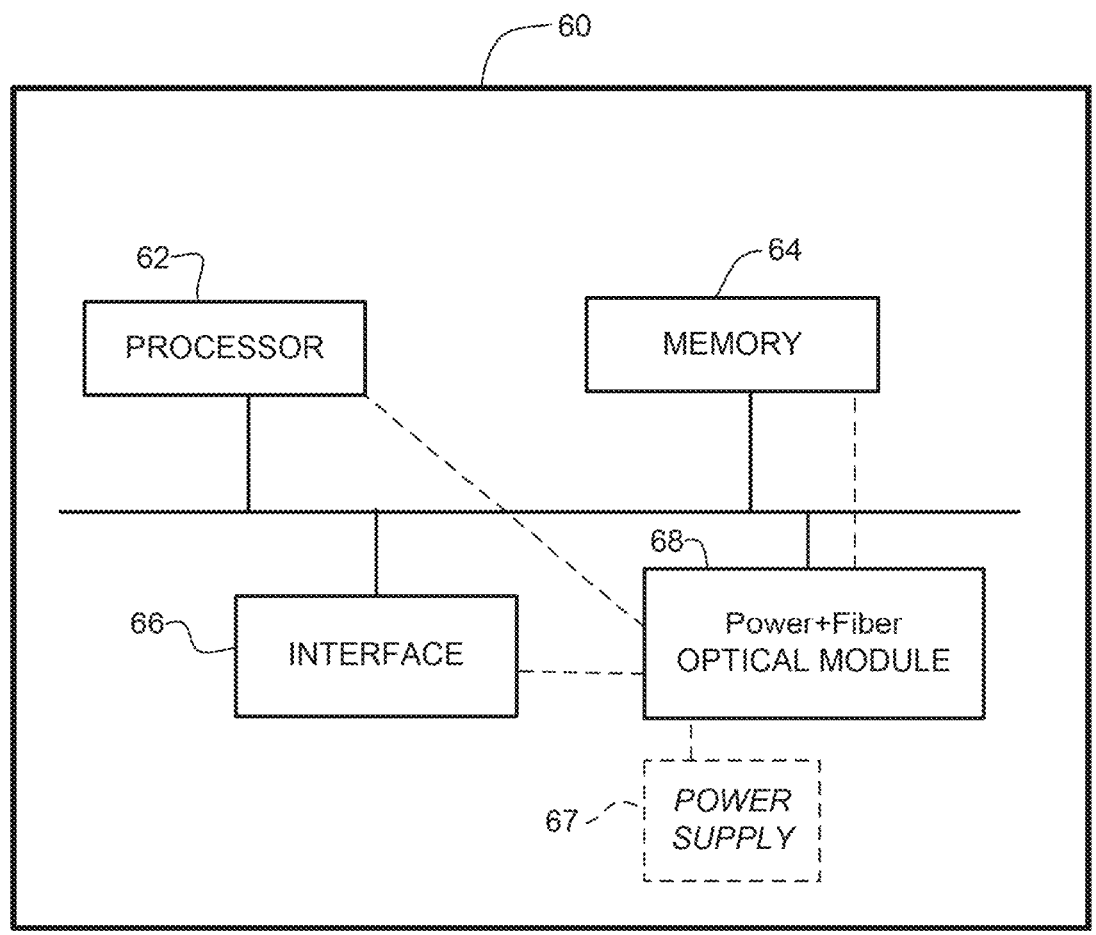
FIG. 6 depicts an example of a network device useful in implementing embodiments described herein.

FIG. 6 illustrates an example of a network device 60 (e.g., switch 14, access point 15, central hub 10 in FIG. 1) that may be used to implement the embodiments described herein. In one embodiment, the network device 60 is a programmable machine that may be implemented in hardware, software, or any combination thereof. The network device 60 includes one or more processors 62, memory 64, interface 66, and power+fiber (PoE+F) optical module 68 (e.g., optical transceiver 16 in FIG. 1).

Memory 64 may be a volatile memory or non-volatile storage, which stores various applications, operating systems, modules, and data for execution and use by the processor 62. For example, components of the optical module 68 (e.g., code, logic, or firmware, etc.) may be stored in the memory 64. The network device 60 may include any number of memory components.

The network device 60 may include any number of processors 62 (e.g., single or multi-processor computing device or system), which may communicate with a forwarding engine or packet forwarder operable to process a packet or packet header. The processor 62 may receive instructions from a software application or module, which causes the processor to perform functions of one or more embodiments described herein.

Logic may be encoded in one or more tangible media for execution by the processor 62. For example, the processor 62 may execute codes stored in a computer-readable medium such as memory 64. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. Logic may be used to perform one or more functions described above with respect to the flowcharts of FIGS. 5A-5D or other functions such as power level negotiations or safety subsystems described below. The network device 60 may include any number of processors 62.

The interface 66 may comprise any number of interfaces or network interfaces (line cards, ports, connectors) for receiving data or power, or transmitting data or power to other devices. The network interface may be configured to transmit or receive data using a variety of different communications protocols and may include mechanical, electrical, and signaling circuitry for communicating data over physical links coupled to the network or wireless interfaces. For example, line cards may include port processors and port processor controllers. The interface 66 may be configured for PoE+F, PoE, PoF, ESP, or similar operation.

The optical module 68 may comprise one or more components of the optical transceiver 16 in FIG. 1 and may also include logic, firmware, software, etc. for use with a smart optical module shown in FIGS. 7 and 8 (described below). For example, the optical module 68 may comprise hardware or software for use in power detection, power monitor and control, or power enable/disable. The optical module 68 may further comprise one or more of the processor or memory components, or interface for receiving power and optical data from the cable 18 at a fiber connector, for delivering power and signal data to the network device, or transmitting control signals to the power source 10, for example (FIGS. 1 and 6). As previously described, power is supplied to the optical module by power supply 67 and the optical module 68 provides power to the rest of the components at the network device 60.

It is to be understood that the network device 60 shown in FIG. 6 and described above is only an example and that different configurations of network devices may be used. For example, the network device 60 may further include any suitable combination of hardware, software, algorithms, processors, devices, components, or elements operable to facilitate the capabilities described herein.

Figure 7:
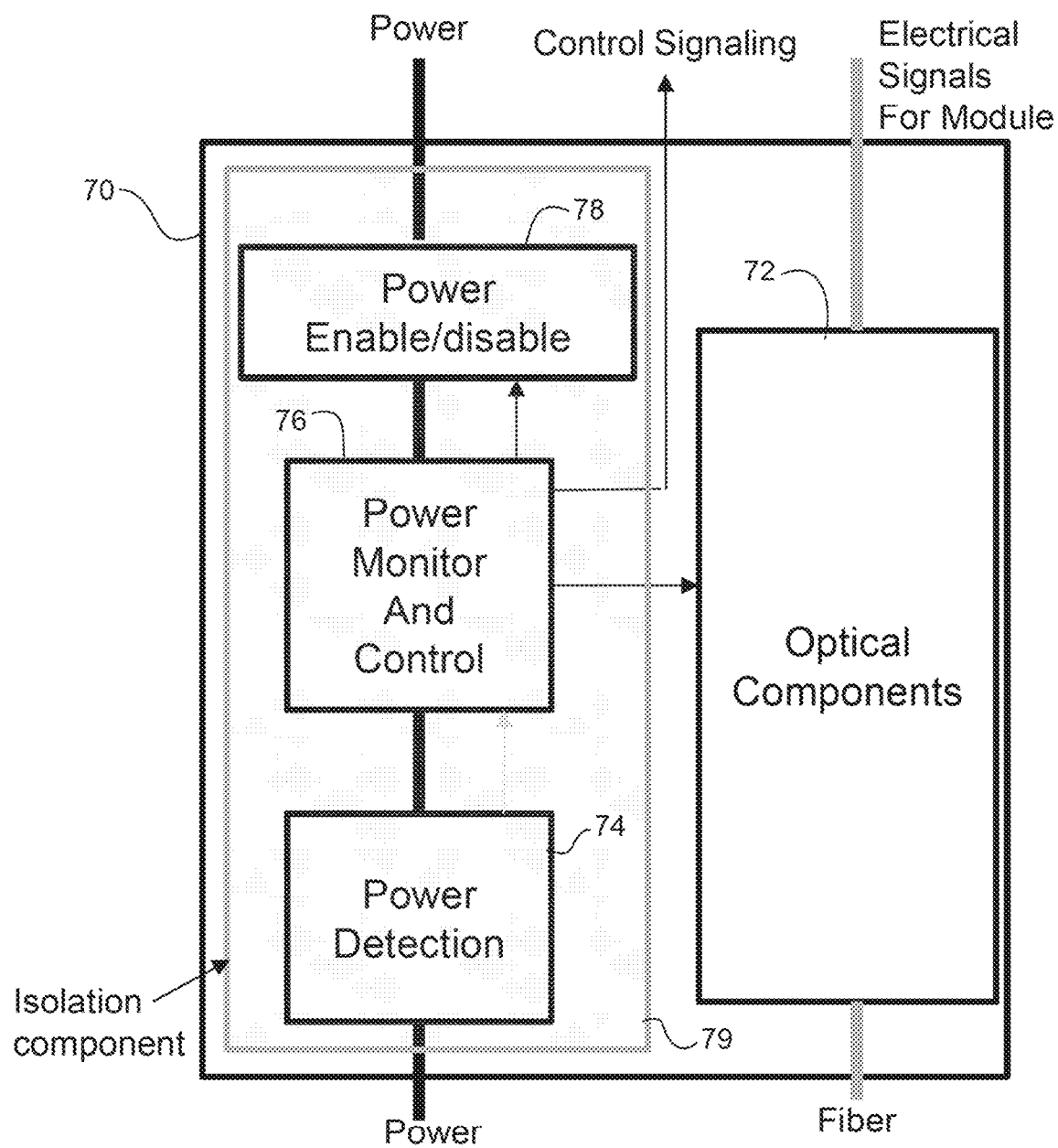
FIG. 7 is a block diagram of a smart optical module, in accordance with one embodiment.

FIG. 7 illustrates a smart optical transceiver 70, in accordance with one embodiment. The smart optical transceiver 70 provides for communication with the power source (e.g., network device 10 in FIG. 1) during power up of the powered device and may provide fault protection and detection. In one embodiment, the device 70 is configured to calculate available power and prevent the cabling system from being energized when it should not be powered. The optical device 70 includes optical components 72 for receiving optical data and converting it to electrical signals (or converting electrical signals to optical data) and power components including power detection module 74, power monitor and control unit 76, and power enable/disable module 78.

Pulse power or advanced PoE driving voltages beyond 60V up to +/−450V, for example, may create electromagnetic interference with the optical circuitry 72. In one embodiment, the power components 74, 76, 78 are isolated from the optical components 72 via an isolation component 79 (e.g., isolation material or element). The isolation component 79 electromagnetically isolates the power circuit from the optical components 72 to prevent interference with operation of the optics.

The power detection module 74 is operable to detect power, energize the optical components 72, and return a message to the power source for fiber or the powered cabling. The return message may be provided via state changes on the power wires or over the optical channel. For example, the return message may be sent from the electrical communications component via the electrical wires in the cable or the return message may be sent from the optical component via optical fibers in the cable. In one embodiment, the power is not enabled by the power enable/disable module 78 until the optical transceiver 70 and the source have determined that the device is properly connected and the power circuit and network device are ready to be powered.

The power monitor and control device 76 continuously monitors power delivery to ensure that the system can support the needed power delivery, and no safety limits (voltage, current) are exceeded. The power monitor and control device 76 may also monitor optical signaling and disable power if there is a lack of optical transitions or communication with the power source.

In one or more embodiments the system may be configured, for example, to identify transmission errors, phase faults (in multi-phase systems), over current, arc events, time base control synchronization faults, MAC drops, or any other communication or power faults or errors. These faults may be identified on a per phase basis in a multi-phase system. A low voltage initialization may be used for startup (or restart) to test the network and components. A high voltage initialization may also be used to allow for adding a new PD or a hot-swap replacement of a PD without requiring a low voltage initialization process. In addition to performing testing during start-up and initialization, testing may continue to be performed during high voltage operation to safely deliver power. In one or more embodiments, fault sensing may be performed through a low voltage safety check combined with a digital interlock that uses the data system to provide feedback on the power system status and set a power operation mode, as described in U.S. patent application Ser. No. 15/971,729, ("High Power and Data Delivery in a Communications Network with Safety and Fault Protection"), filed May 4, 2018, which is incorporated herein by reference in its entirety. The fault sensing may be performed during a low voltage startup or between high power pulses in the pulse power system, as described below.

Figure 8:
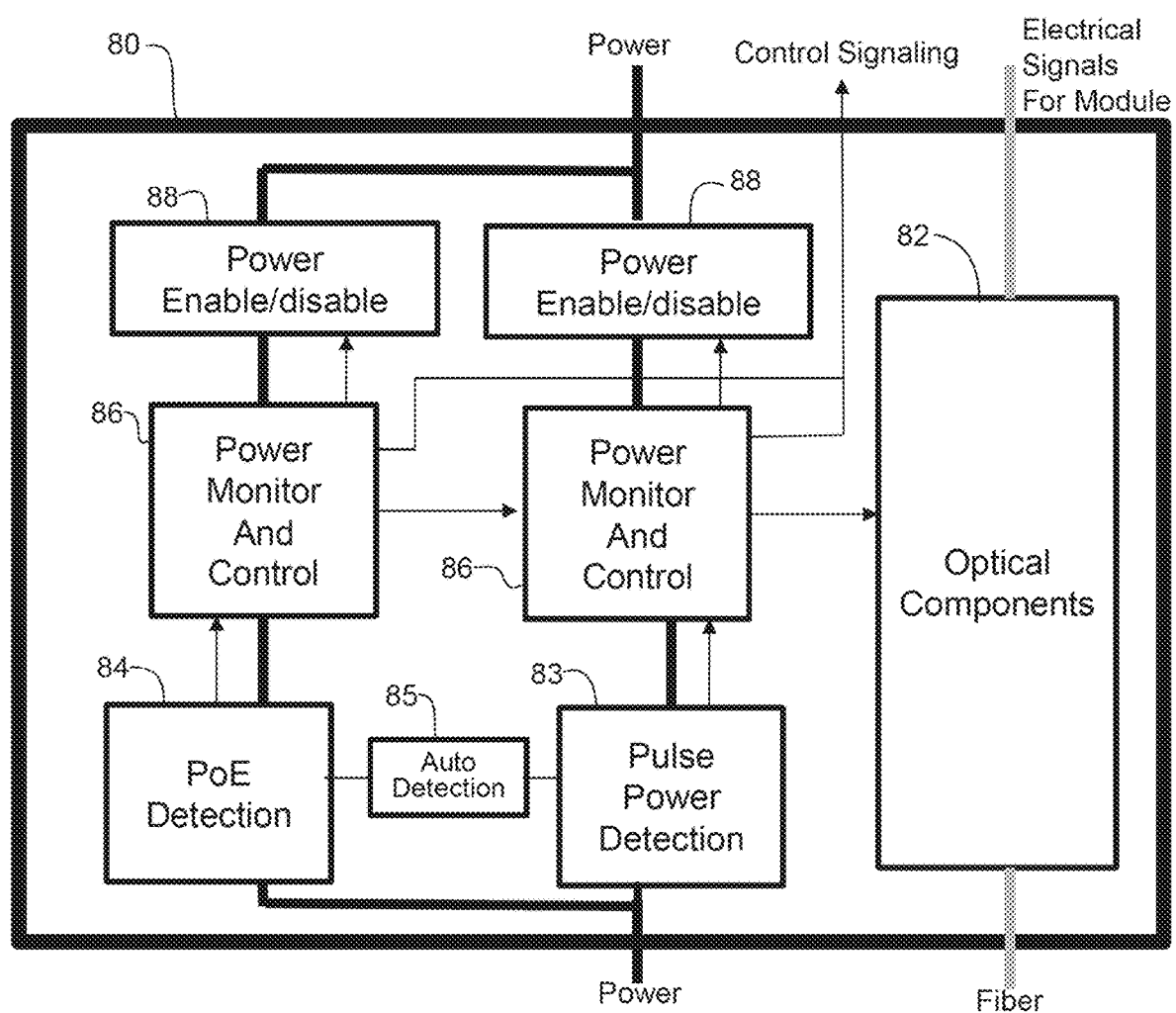
FIG. 8 is a block diagram of the smart optical module of FIG. 7 configured for auto power detection, in accordance with one embodiment.

FIG. 8 illustrates an example of the smart optical transceiver of FIG. 7 with auto power negotiation for PoE or pulse power, in accordance with one embodiment. In addition to auto power negotiation, the PSE and PD may also auto-negotiate power levels and pulse power duty cycle (pulse-on, pulse-off timing). As previously described, the system 80 includes optical components 82 and power components including power monitor and control 86 and power enable/disable 88. In the example shown in FIG. 8, the device 80 includes an auto detection module 85 that operates with a pulse power detection module 83 and PoE detection module 84. Each module 83, 84 is connected to its own power monitor and control module 86 and power enable/disable module 88. The circuit detects the type of power applied to the device 80, determines if PoE or pulse power is a more efficient power delivery method, and then uses the selected power delivery mode. Additional modes may support other power+data standards (e.g., USB (Universal Serial Bus)).

As previously noted, the optical transceiver (optical module) may comprise different types of optical transceivers, including for example, a pluggable optical transceiver module or silicon photonics optical transceiver. The term "optical transceiver" as used herein may refer to any type of optical component, module, network transceiver, or device operable to receive and transmit optical signals and configured to deliver power to or from a network device in which the optical transceiver is installed. FIGS. 11A-11B illustrate an example of an optical module configured to receive a modified fiber connector (FIGS. 10A-10B) and pass power through an optical module cage system (FIGS. 12A-12B), as shown in the assembly of FIG. 13. FIGS. 20A-23B illustrate modification of the system shown in FIGS. 11A-13 for use with multi-phase pulse power. FIGS. 24-25 illustrate an example of in-package optics with an ESP engine integrated with a silicon photonics optical transceiver. It is to be understood that the optical transceivers shown and described herein are only examples and that other optical devices configured to receive and transmit power and data may be used to implement PoE+F, ESP, pulse power, or multi-phase pulse power as described herein without departing from the scope of the embodiments.

Figure 9A:
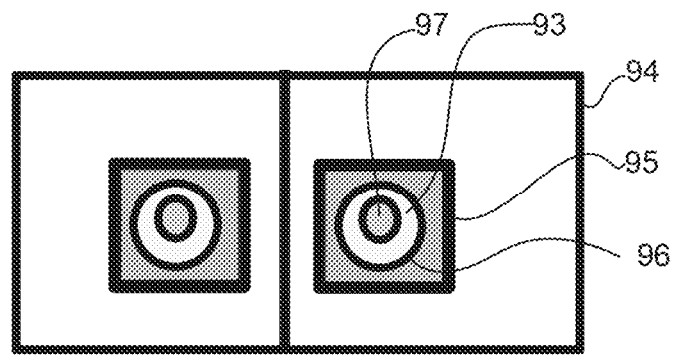
FIG. 9A is a front view of a fiber connector, in accordance with one embodiment.
Figure 9B:
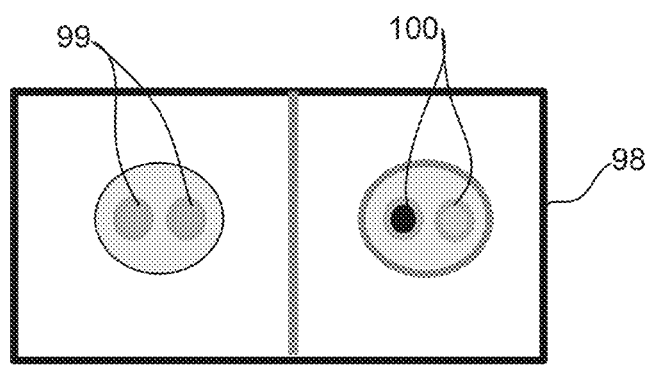
FIG. 9B is a front view of the fiber connector, in accordance with another embodiment.
Figure 9C:
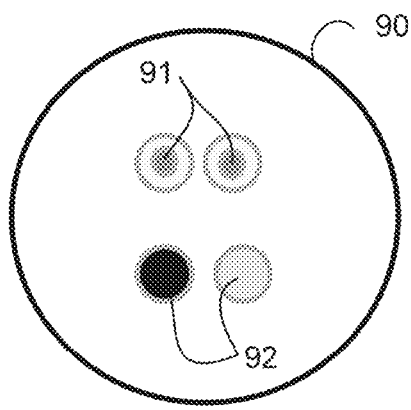
FIG. 9C is a cross-sectional view of a power and data fiber cable for use with the fiber connector, in accordance with one embodiment.

Referring now to FIGS. 9A and 9B, two examples of a modified fiber connector are shown for receiving or transmitting power and fiber from or to a cable 90 comprising optical fibers and electrical wires, as shown in FIG. 9C. The connector may comprise, for example, a modified LC (Local Connector, Lucent Connector) generally corresponding to a standard LC format. In the example shown in FIG. 9C, the cable 90 includes two data fibers 91 and two electrical wires 92 (e.g., copper, aluminum, metal) enclosed in a cable jacket.

In one example, the copper wires may be 18 AWG (American Wire Gauge) or another size/capacity (e.g., 10 AWG), or any other suitable size or capacity according to any applicable standard. The copper wires 92 may be bonded separately to the optical connector, which allows a modified LC connector system to be implemented without extending a bulkhead connection. As described below, a crimp system may be used to connect the copper wires 91 to the respective plus/minus (plus/return, power/return) connections. It is to be understood that the optical fiber and electrical wire arrangement of the cable 90 shown in FIG. 9C is only an example. The cable may include any number of optical fibers 91 or electrical wires 92 in any arrangement. For example, the cable may include additional data fibers or power wires as described below with respect to a modified MPO (Multi-fiber Push On/Pull Off) connector shown in FIGS. 16A, 16B, 17A, and 17B. The cable may also include cooling as described below with respect to FIGS. 14 and 19.

In the connector 94 shown in the example of FIG. 9A, chassis ground is on an outer case 95, copper (metal) contact 96 for power is on the outside of a ferrule 93, and fiber 97 is inside the ferrule. In this example, the outer housing 95 is metalized for digital ground and the outer ferrule 96 is metalized for power. Data fiber 97 is in ferrule 93, as with conventional LC connectors. In another example, ground may be connected on one side of the dual connector at the outer ferrule instead of the outer case on both sides of the connector.

In another dual LC connector 98 example shown in FIG. 9B, one side of a connector contains two fibers 99 and the other side of the connector contains power wires 100. It is to be understood that the configurations shown in FIGS. 9A and 9B are only examples and that other arrangements may be used without departing from the scope of the embodiments.

Figure 10A:
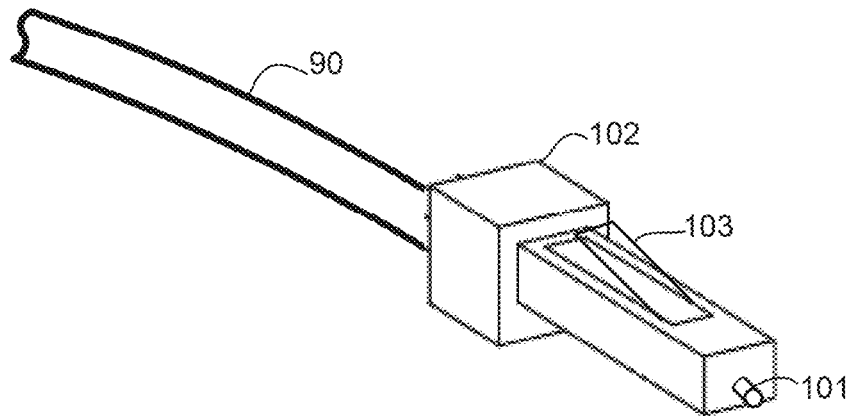
FIG. 10A is a top perspective of the fiber connector, in accordance with one embodiment.
Figure 10B:
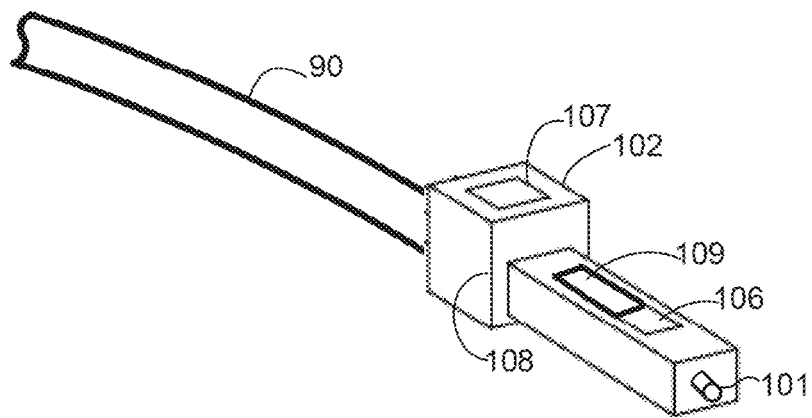
FIG. 10B is a bottom perspective of the fiber connector of FIG. 10A.
Figure 11A:
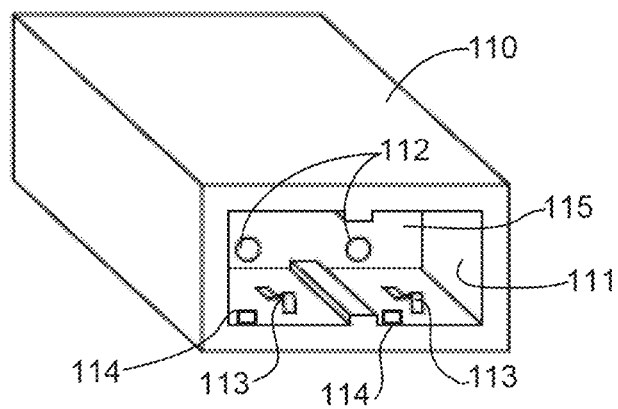
FIG. 11A is a front perspective of an optical module, in accordance with one embodiment.
Figure 11B:
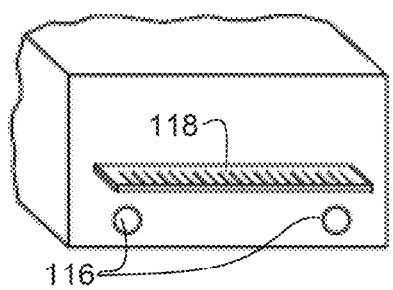
FIG. 11B is a rear perspective of the optical module of FIG. 11A.

FIGS. 10A and 10B illustrate details of one example of an LC connector 102 modified to include an external contact plate 106 and a crimp point 107 for which electrical wires can be crimped onto the connector. The connector 102 is configured for coupling the cable 90 comprising at least one optical fiber and at least one electrical wire to an optical module at a network communications device. In one or more embodiments, the connector 102 comprises the electrical contact plate 106 for engagement with an electrical contact 113 on an optical module 110 and a ferrule 101 for receiving one or more optical fibers (FIGS. 10A, 10B, and 11A). The electrical contact plate 106 is configured for electrically coupling the electrical wire to the electrical contact 113 on the optical module 110 for delivery of power through the optical module.

As with conventional LC connectors, the connector 102 may include a latch mechanism 103 on an upper side that allows the connector to be easily engaged and disengaged. The connector 102 mechanically couples and aligns the fibers in ferrule 101 so that light can pass through to the optical transceiver. The modified connector 102 receives a cable (e.g., cable 90 shown in FIG. 9C) comprising optical fiber (or fibers) and power wire (or wires). As shown in the bottom view of FIG. 10B, the connector 102 further comprises an external metal contact plate (e.g., one or more copper pads) 106 and crimp point 107 onto which the copper wire can be crimped. As described below with respect to FIG. 11A, the optical module 110 includes an internal electrical input (e.g., tab or wire contact) 113 for interface with the contact plate 106. A portion 108 of the connector body may be extended to allow for the copper wire to be crimped using a standard press-in crimp method. In one embodiment, the housing 108 is elongated to support 10, 12, 14, 16, or 18 AWG wire systems.

In one or more embodiments, a spring loaded slide cover 109 (shown partially open in FIG. 10B) may be provided to cover the electrical contact point 106 as the connector is removed from the optical module 110 to prevent an energized cable from becoming grounded during handling. The cover 109 is pushed back during insertion of the connector 102 into the optical device, thereby allowing mating contact between the external contact plate 106 and the internal contact point 113 on the optical module 110 when the connector is inserted. If the optical device is not configured to receive power (conventional non-power LC connector), communications compatibility is maintained through the common LC connector interface.

As described below with respect to FIGS. 20A-23B, the connector may include additional contact plates 106 for use with multi-phase pulse power.

It is to be understood that the connector shown in FIGS. 10A and 10B is only an example and that other connectors or configurations may be used without departing from the scope of the embodiments. For example, in one embodiment, an MPO (Multi-fiber Push On/Pull Off) coupling may be used. Also, a single fiber system is shown in FIGS. 10A and 10B, however, two LC connectors in a duplex fiber system may be used as previously described with respect to FIGS. 9A and 9B to provide for a power wire and a return wire to interconnect with the optical device.

FIGS. 11A and 11B illustrate an example of an optical module 110 configured to receive power from the modified LC connector 102 of FIG. 10B and pass the power through the optical module. The optical module 110 includes an opening 111 configured for receiving two connectors 102 at a front end (FIGS. 10A and 11A). A rear wall 115 of the opening 111 includes fiber inputs 112. The optical module 110 further includes internal electrical input contacts (power tabs, wires, angled spring fingers) 113 for contact with the connector external power pad 106 (FIGS. 10B and 11A). The optical device 110 sources power or receives power through these contact points 113. In one example, the system is configured to handle PoE class 8 systems (up to 100 W), as well as other power distribution systems such as pulse power, multi-phase pulse power, and ESP. In one embodiment, the optical module 110 may include keying to prevent insertion of certain types of cables into incompatible modules.

In one or more embodiments, a hook/post arrangement (post) 114 is used to slide the protective cover 109 out of the way to allow for contact between the external contact plate 106 on the connector 102 and the internal electrical power input tab 113 on the optical module 110.

As shown in the rear view of FIG. 11B, two female receptacles 116 are provided to connect to the system module cage (FIG. 12B), along with electrical signal interface 118 for data and control. If different types of modules are used for PD and PSE interfaces, one may include male pins and the other female sockets. The use of female connectors for power at the rear of the module allows for the module to be accidentally removed under power without damaging anything or anyone. The power output points 116 may be located on a lower portion of the optical device 110 as shown in FIG. 11B or an upper portion of the device.

Figure 12A:
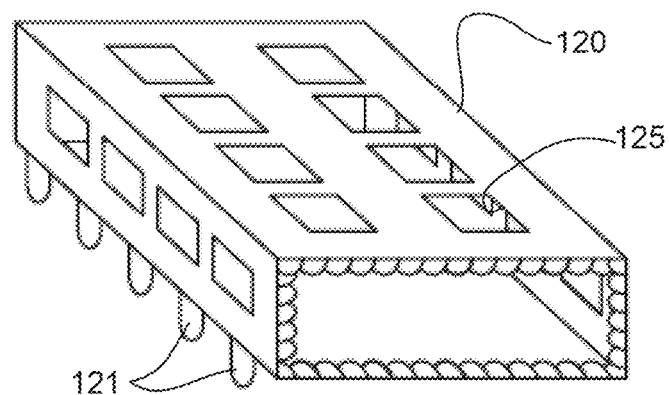
FIG. 12A is a front perspective of an optical module cage, in accordance with one embodiment.
Figure 12B:
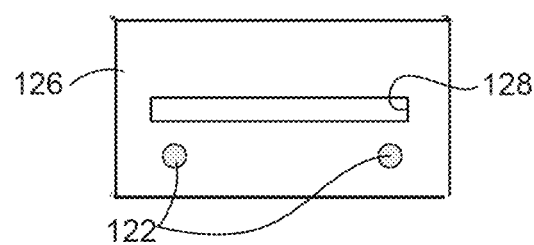
FIG. 12B is an internal view of a rear wall of the optical module cage of FIG. 12A.
Figure 13:
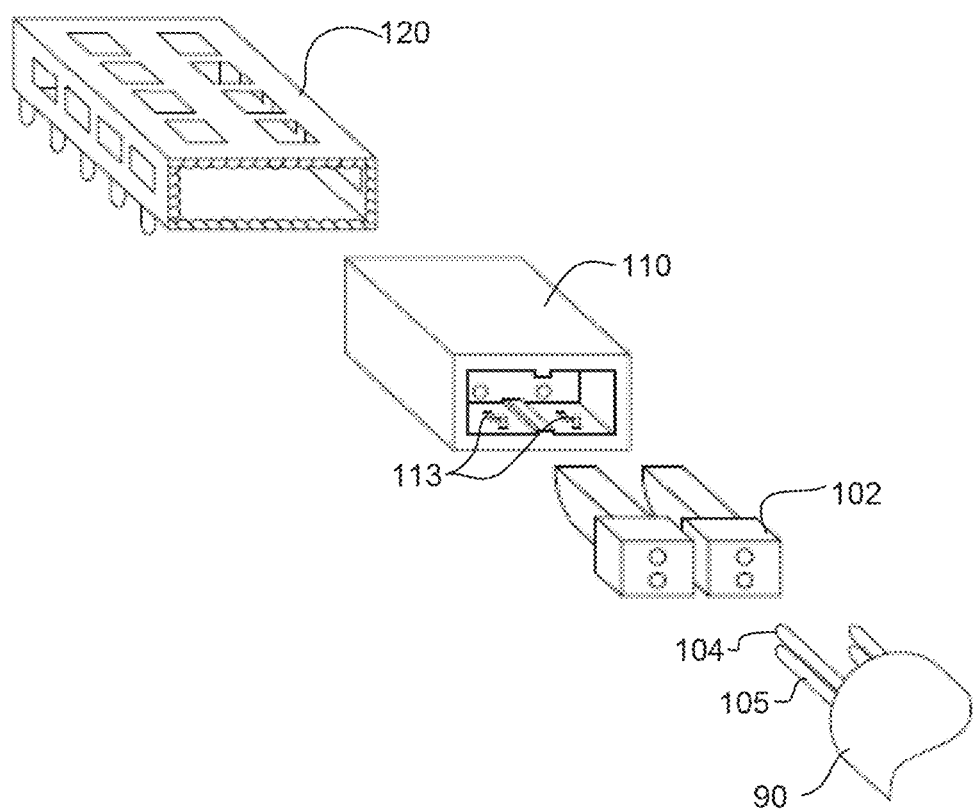
FIG. 13 is an exploded view of the cable, connector, optical module, and optical module cage, in accordance with one embodiment.

FIGS. 12A-12B illustrate an example of an optical module cage 120 for the optical module shown in FIGS. 11A-11B. The optical module cage 120 may include cage ground points 121 and air flow openings 125, for example. As shown on the internal rear wall 126 of the module cage in FIG. 12B, the cage is modified to include two male power posts 122 (+, return) for mating with the female receptacles 116 on the optical module (FIGS. 11B and 12B). The rear wall 126 further includes an opening 128 with contacts (not shown) for receiving electrical signal interface 118. As previously described with respect to the optical module, the module cage interface may also include keying to prevent a mismatch between incompatible components.

FIG. 13 is an exploded view showing the fiber and power cable 90, connectors 102, optical module 110, and optical module cage 120, in accordance with one embodiment. In this example, the cable 130 includes two optical fibers 104 and two power wires 105 for connection with the modified LC connector 102 comprising power pads added to a bottom of the connector and a crimping mechanism to allow for attachment of the copper wires 105, as shown in FIG. 10B. The modified optical module 110 may pass through the power received at electrical contact points 113 from the connector 102 to the optical module cage 120, which passes power through to the circuit board (e.g., line card, route processor, fabric card) or the optical module may pass through power from the network device to the cable 90.

Figure 14:
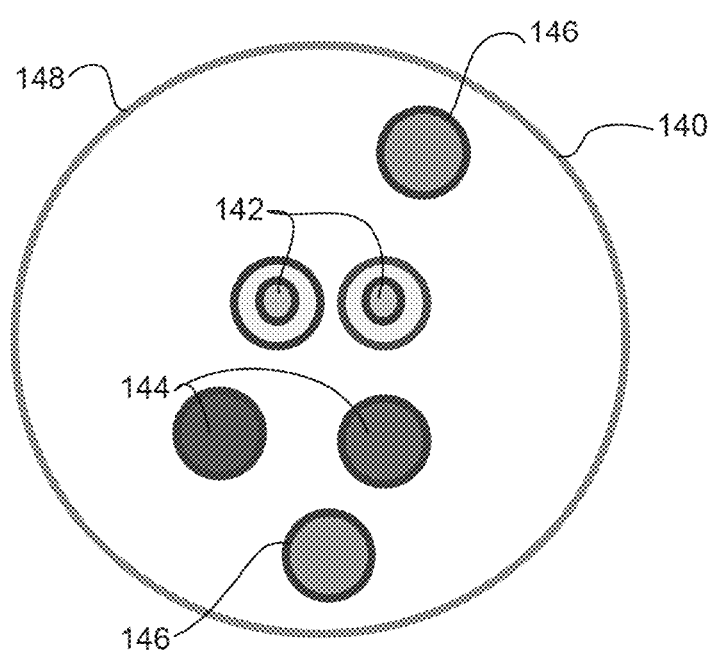
FIG. 14 is a cross-sectional view of a cable carrying power, fiber optic data, and cooling, in accordance with one embodiment.

As previously noted, the power and fiber cable may also include cooling. FIG. 14 is a cross-sectional view of a cable design incorporating fiber, power, and cooling. In this example, a cable 140 includes two data fibers 142, two copper wires 144, and two cooling pipes 146. The cooling lines may, for example, deliver liquid such as water, refrigerant, or high pressure air to the powered device and powered equipment. The system may be used to provide cooling to devices and equipment in remote areas where traditional cooling is not available. The cable jacket 148 may provide additional insulation, along with insulation on the cooling pipes 146 to provide effective cooling over a 10 km reach, for example.

Figure 15:
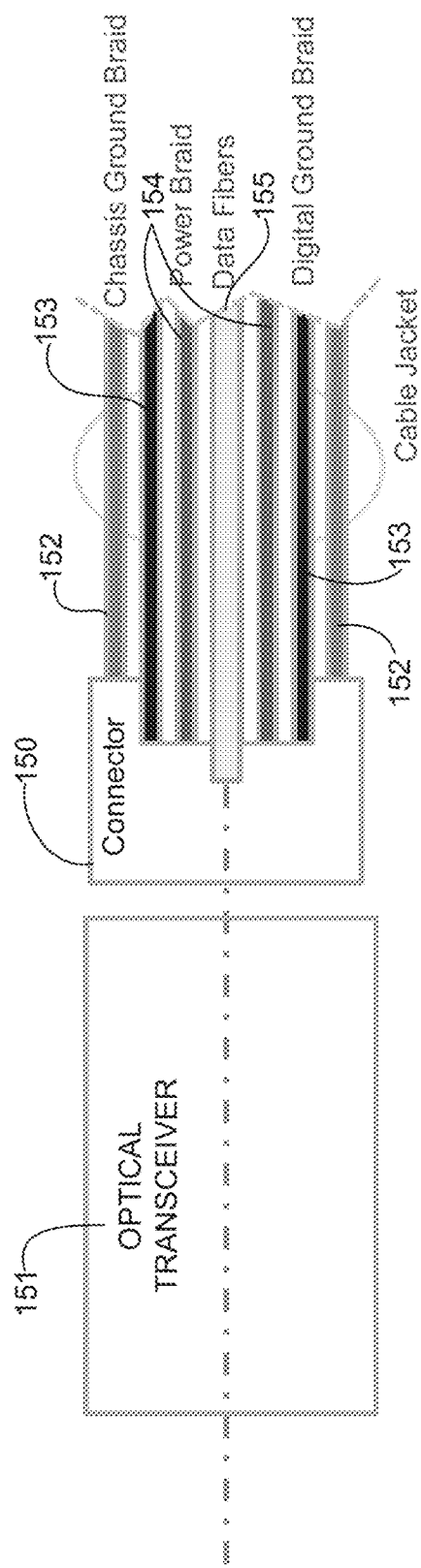
FIG. 15 is a side view of a connector and cable assembly and optical module, in accordance with one embodiment.

FIG. 15 illustrates an example of a connector cable assembly comprising power, fiber, and cooling, in accordance with one embodiment. A connector (e.g., modified MPO connector) 150 provides power and data to optical transceiver 151. Press crimp interconnectors may be used to terminate power, ground, and shield, as previously described. The example shown in FIG. 15 includes two chassis grounds 152, two signal grounds 153, and two optical fibers 155. Power 154 may include one connection or two or more pins/mates. The cable may also include cooling pipes (e.g., two cooling pipes and two return pipes) (not shown). The connector cable assembly may also be configured to include additional fibers (e.g., from two to twenty-four fibers).

Figure 16:
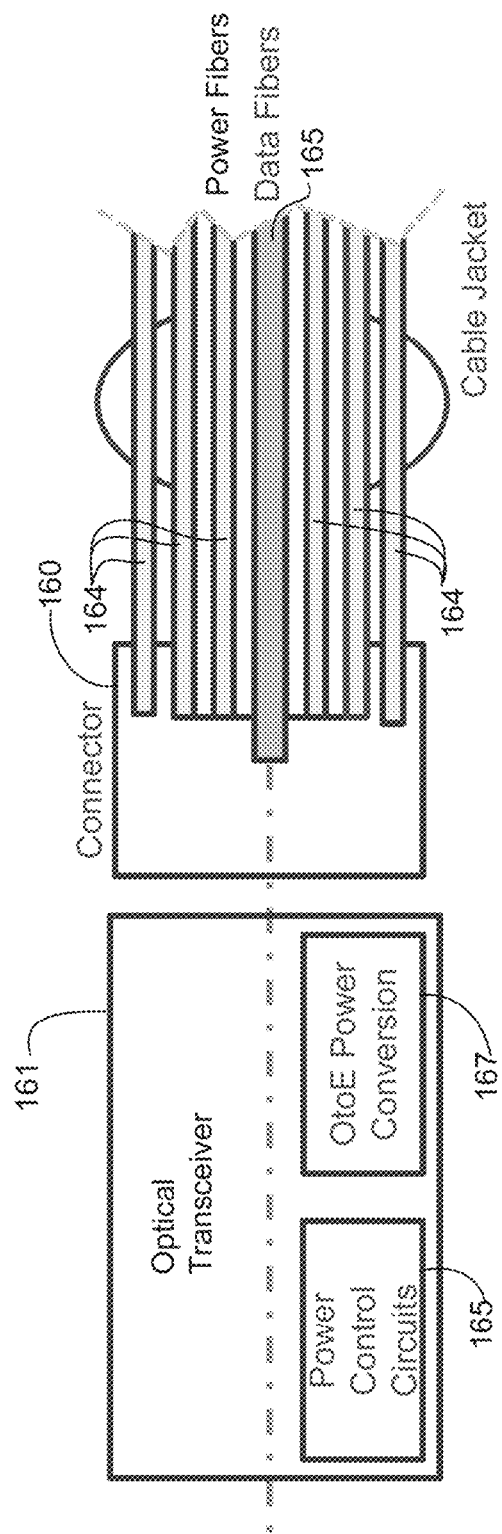
FIG. 16 is a side view of a connector and cable assembly and optical module, in accordance with another embodiment.

FIG. 16 shows another example of a connector 160. The optical transceiver 161 is shown with power control circuits 165 and optical to electrical power conversion module 167. In this example, the connector 160 and optical module 161 are configured for six power fibers 164 and two optical fibers 165 for data. In this example, power is delivered optically over fibers 164. The connector cable assembly shown in FIG. 16 may comprise any number or combination of power and optical fibers.

It is to be understood that the configuration, arrangement, and number of power/ground wires and fibers shown in FIGS. 15 and 16 are only examples and that other arrangements or number of wires and fibers may be used without departing from the scope of the embodiments.

Figure 17:
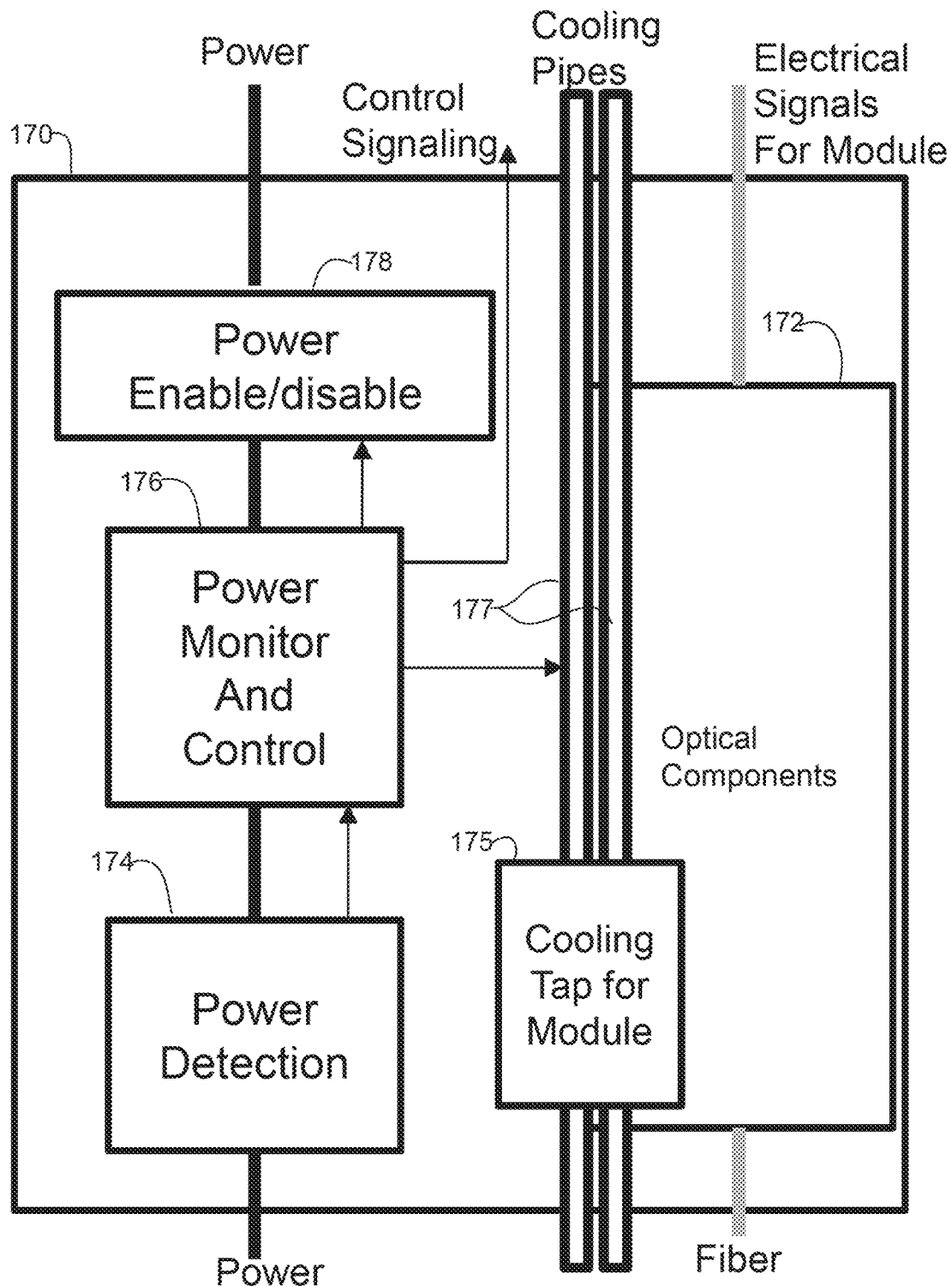
FIG. 17 is a block diagram of the smart optical module of FIG. 7 with cooling, in accordance with one embodiment.

FIG. 17 illustrates the smart optical device of FIG. 7 with cooling pass-through lines 177. As previously described, the optical device 170 includes optical components 172, power detection 174, power monitor and control 176, and power enable/disable 178. The optical device 170 may also include additional components shown in FIG. 8, for example. The cooling pipes 177 provide cooling to the powered equipment and return cooling. A cooling tap 175 is also provided for the optical module 170. In one embodiment, the optical module cage passes the cooling through to the system and returns the heat generated within the optical components 172 out through the module and into the coolant.

Figure 18A:
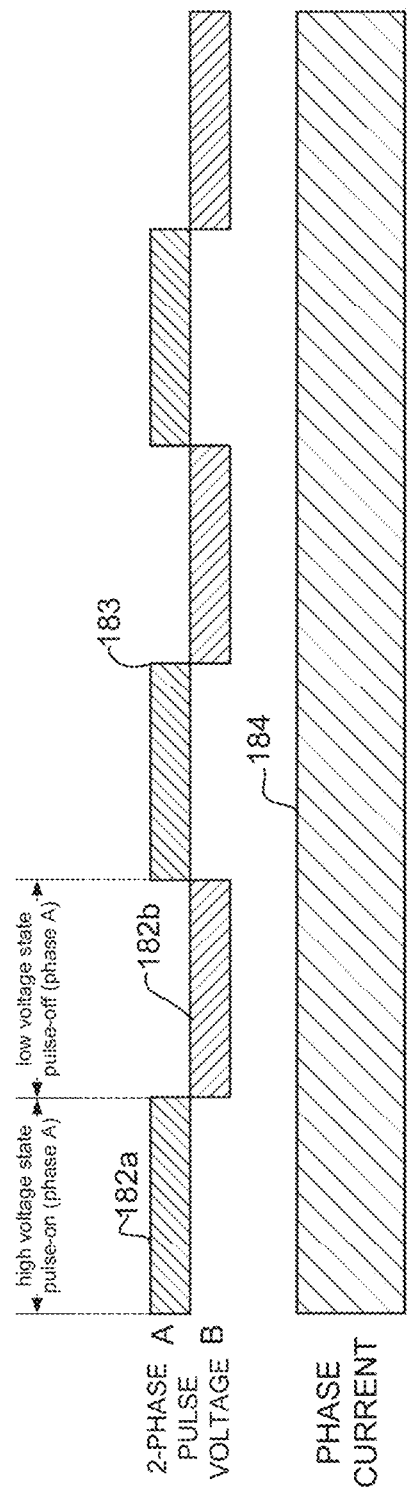
FIG. 18A illustrates a simplified example of voltage and current for a two-phase pulse power system, in accordance with one embodiment.
Figure 18B:
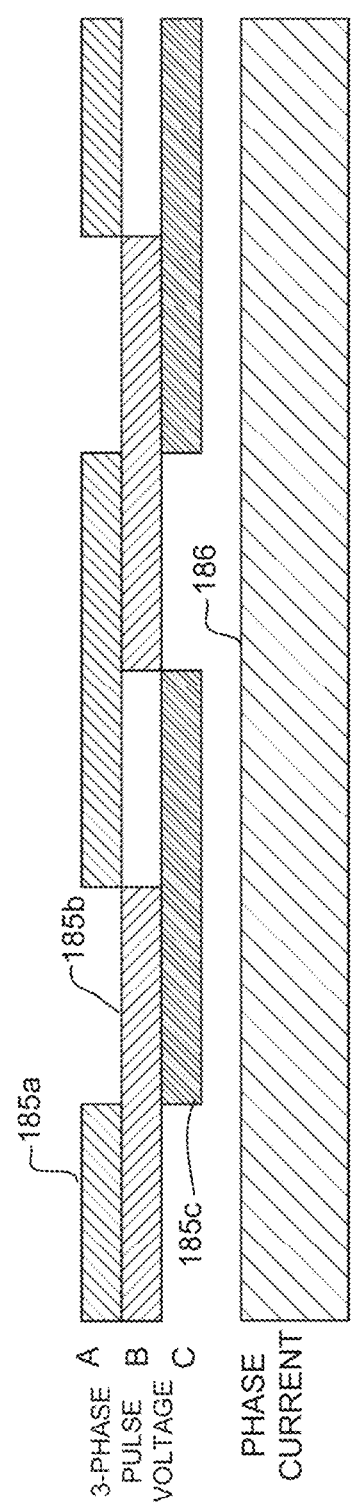
FIG. 18B illustrates a simplified example of voltage and current for a three-phase pulse power system, in accordance with one embodiment.

As previously described, in one or more embodiments, the power may comprise high voltage pulse power or high voltage multi-phase pulse power. FIGS. 18A and 18B schematically illustrate simplified examples of voltage and current in a two-phase and three-phase pulse power system, respectively. Referring first to FIG. 18A, voltage for phase A is shown at 182a and voltage for phase B is shown at 182b. The continuous phase current is shown at 184. The pulse power for each phase comprises a plurality of voltage pulses defining alternating high voltage states and low voltage states. As shown in FIG. 18A, the voltage is switched between a pulse on-time (e.g., voltage >24 VDC, voltage ≥60 VDC, voltage ≥380) and a pulse off-time (e.g., voltage <12V, ≤24V). The voltage pulses are offset between phases to provide continuous power.

In the three-phase system of FIG. 18B, voltage for phase A is shown at 185a, voltage for phase B is shown at 185b, and voltage for phase C is shown at 185c. The continuous phase current is shown at 186.

It is to be understood that the voltages, currents, and duty cycles shown in FIGS. 18A and 18B illustrate simplified examples with idealized waveforms. As previously noted, the voltage during off-time may be greater than zero for use in fault detection. For example, the voltage during pulse-off time may comprise a low voltage to provide for fault sensing during pulse-off time. In one or more embodiments, the pulse-on time is greater than the pulse-off time. For example, the high voltage may be pulsed on for 4 ms and off for 1 ms. In another example, the high voltage may be pulsed on for 8 ms and off for 4 ms. Also, the voltage pulse-on times may overlap between phases so that at least one wire is on at any time, as shown in FIG. 18B. During phase overlap in the multi-phase system, the total cable current is shared across all ON wires. When the phases are combined at the PD, the result is continuous DC voltage as shown by the phase current 184 and 186. As described in U.S. patent application Ser. No. 16/380,954, referenced above, the multi-phase system may comprise any number of phases, with any phase offset or overlap, or duty cycle.

Figure 19:
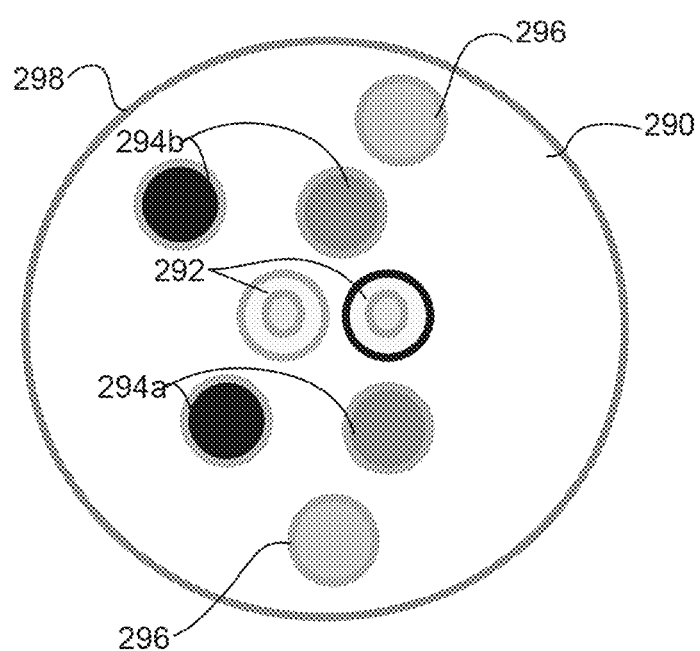
FIG. 19 is a cross-sectional view of one example of a cable for use in a multi-phase pulse power system with optional cooling, in accordance with one embodiment.

FIG. 19 is a cross-sectional view of a cable design incorporating fiber, power, and cooling for use with multi-phase pulse power, pulse power and PoE, or PoE, in accordance with one embodiment. In this example, a cable 290 includes two data fibers 292, two copper wire pairs 294a, 294b, and two cooling lines 296. The cooling lines 296 may, for example, deliver water, refrigerant, or high pressure air to the powered device and power sourcing equipment, as previously described. A cable jacket 298 may provide additional insulation, along with insulation on the cooling lines 296 to provide effective cooling. As previously noted, the cooling pipes 296 are optional. The copper wire pairs 294a, 294b may each be configured to carry only PoE (e.g., rated for low voltage) or configured to carry PoE or high voltage pulse power. If the wire pair is rated to carry high voltage power, the wires may be used to transmit PoE or high voltage pulse power depending on the capability or power requirements of the powered device. The cable 290 may also include additional wires or wire pairs. For example, the cable may include a third wire pair for use in transmitting three-phase pulse power.

Figure 20A:
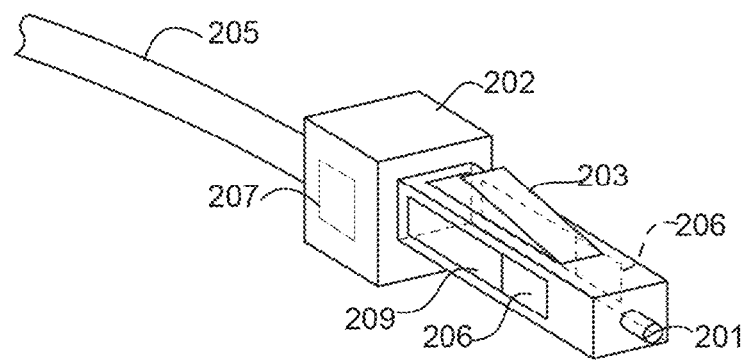
FIG. 20A is a top perspective of a multi-phase pulse power and fiber connector, in accordance with one embodiment.
Figure 20B:
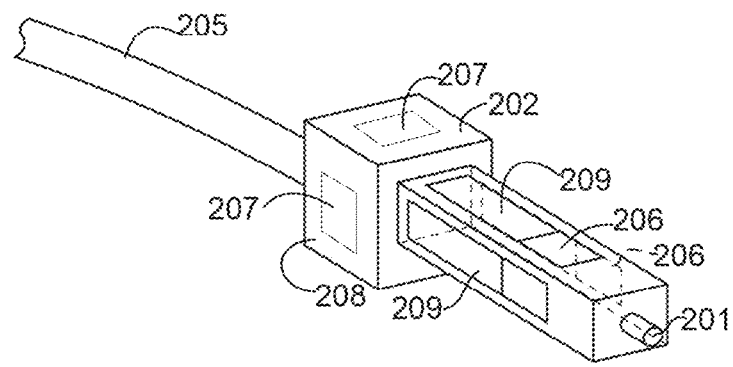
FIG. 20B is a bottom perspective of the multi-phase pulse power and fiber connector of FIG. 20A.

FIGS. 20A and 20B illustrate details of one example of an LC connector 202 for use in delivering (transmitting or receiving) multi-phase pulse power through an optical transceiver. It is to be understood that the term "connector" as used herein refers to any type of interconnect. The connector 202 is modified to include a plurality of external electrical contact plates 206 and a crimp point 207 for use in crimping electrical wires from the cable 205 onto the connector. The electrical contact plates 206 are configured for engagement with a plurality of electrical contacts 213 on an optical module 210 to electrically couple electrical wires in the cable 205 to the electrical contacts 213 on the optical module for delivering multi-phase pulse power. As with conventional LC connectors, the connector 202 may include a latch mechanism 203 on an upper side that allows the connector to be easily engaged and disengaged. The connector 202 mechanically couples and aligns one or more optical fibers in ferrule 201 so that light can pass through to the optical transceiver. In the example shown in FIG. 20B, the connector 202 is configured for transmitting or receiving three-phase pulse power. As previously described with respect to FIG. 18B, each of the three-phases comprises a sequence of pulses (alternating high voltage state (pulse-on) and low voltage state (pulse-off)) with the pulses offset between phases to provide continuous power. Each of the three remaining sides of the connector 202 (without the connector latch mechanism 203) comprises the electrical contact plate (e.g., one or more copper pads) 206 and crimp points 207 onto which the copper wire can be crimped. For a two-phase pulse power system, the electrical contacts may only be provided on two sides of the connector or only two wires may be crimped onto two of the contact plates 206. As described below with respect to FIG. 21A, the optical module 210 includes internal electrical contacts 213 (e.g., tab or wire contact) for engagement with the contact plates 206. A portion 208 of the connector body may be extended to allow for the copper wires to be crimped using a standard press-in crimp method at crimp points 207, as previously described with respect to FIGS. 10A and 10B.

In one or more embodiments, spring loaded slide covers 209 (shown partially open in FIGS. 20A and 20B to show the contact plates 206) may be provided to cover the electrical contact plates 206 as the connector is removed from the optical module 210 to prevent an energized cable from becoming grounded during handling. The covers 209 are spring loaded to their closed position when the connector 202 is removed from the optical module 210. The covers 209 are pushed back during insertion of the connector 202 into the optical module, thereby allowing electrical contact between the external contact plates 206 and the internal contacts 213 on the optical module when the connector 202 is inserted into the optical module. If the optical module is not configured to receive power (conventional non-power LC connector), communications compatibility is maintained through the common LC connector interface.

Figure 21A:
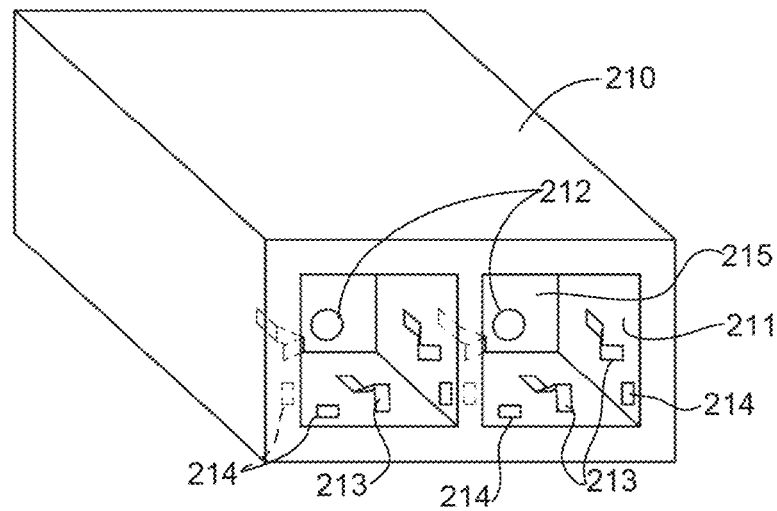
FIG. 21A is a front perspective of an optical module for use with the multi-phase pulse power and fiber connector of FIG. 20A, in accordance with one embodiment.
Figure 21B:
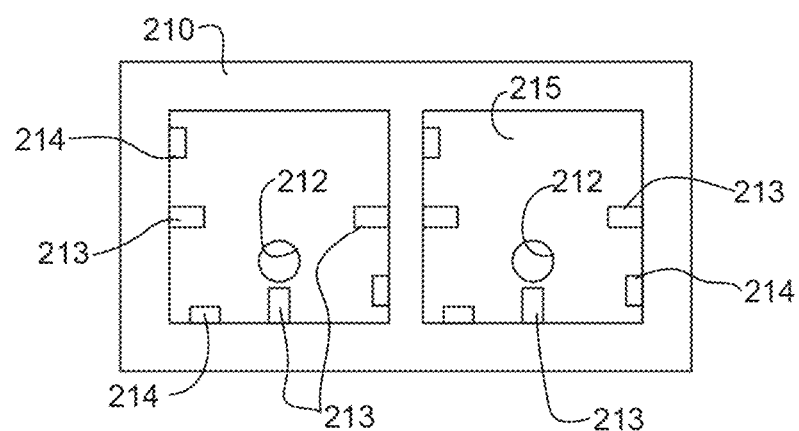
FIG. 21B is a front view of the optical module of FIG. 21A.

FIGS. 21A, 21B, 22A, and 22B illustrate an example of an optical module 210 configured to receive multi-phase pulse power from the modified LC connector 202 of FIGS. 20A and 20B and pass the power through the optical module or transmit multi-phase pulse power to the connector from the optical module. Referring first to FIGS. 21A and 21B, a front perspective and front view of the optical module 210 are shown, respectively. The optical module 210 includes an opening 211 configured for receiving two connectors 202 at a front end (FIGS. 20A and 21A). A rear wall 215 of the opening 211 includes fiber inputs 212. The optical module 210 further includes internal electrical input contacts (power tabs, wires, angled spring fingers) 213 on three internal walls for contact with the connector external power pad 206 (FIGS. 20B, 21A, 21B). The optical module 210 sources power or receives power through these contact points 213. As previously described, a hook/post arrangement (posts) 214 may be used to slide the protective covers 209 out of the way to allow for contact between the external contact plates 206 on the connector 202 and the internal electrical contacts 213 on the optical module 210 to electrical couple the wires crimped onto the contact plates 206 of the connector 202 with the electrical contacts 213 of the optical module 210.

Figure 22A:
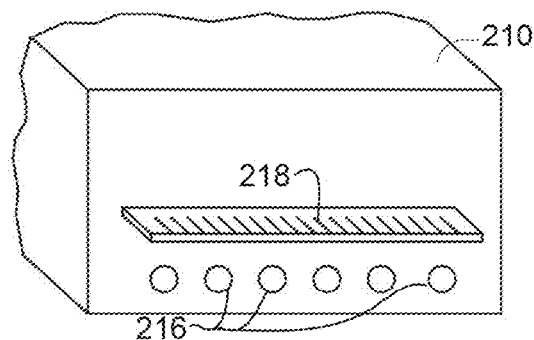
FIG. 22A is a rear perspective of the optical module of FIG. 21A, in accordance with one embodiment.
Figure 22B:
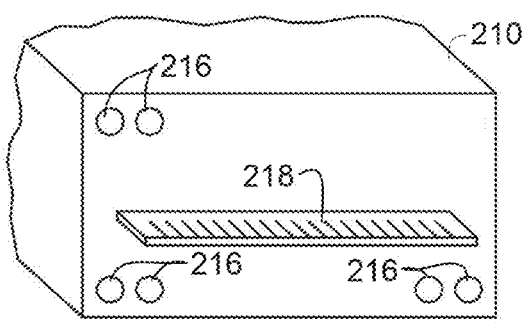
FIG. 22B is a rear perspective of the optical module of FIG. 21A, in accordance with another embodiment.

FIGS. 22A and 22B are rear views of the optical module 210 (end opposite of opening 211 receiving the connector). In this example, the optical module 210 includes six female receptacles 216 providing a power connection to the system module cage (FIGS. 12A, 23A, 23B), along with an electrical signal interface 218 for data and control. If different types of modules are used for PD and PSE interfaces, one may include male pins and the other female sockets. The use of female connectors for power at the rear of the module allows for the module to be accidentally removed under power without damaging anything or anyone. The power output points 216 may be located on a lower portion of the optical module 210 as shown in FIG. 22A, an upper portion of the device, or one pair may be located at each of three corners as shown in FIG. 22B. It is to be understood that these are only examples and other arrangements may be used.

Figure 23A:
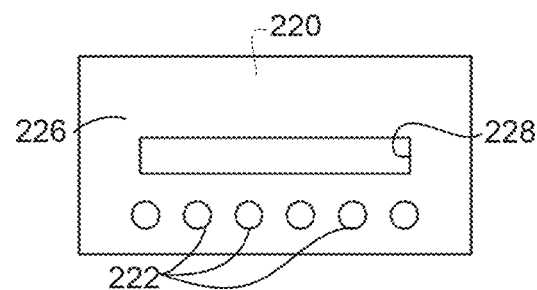
FIG. 23A is an internal view of a rear wall of the optical module cage of FIG. 12A for use with the optical module shown in FIG. 22A, in accordance with one embodiment.
Figure 23B:
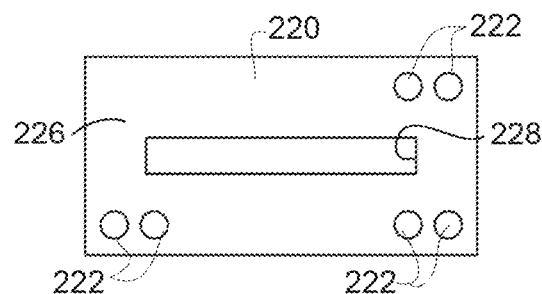
FIG. 23B is an internal view of a rear wall of the optical module cage of FIG. 12A for use with the optical module shown in FIG. 22B, in accordance with one embodiment.

FIGS. 23A and 23B illustrate an example of an internal wall 226 of an optical cage 220 (e.g., optical module cage 120 shown in FIG. 12A) for use with multi-phase pulse power. As shown on the internal rear wall 226 of the module cage 220 in FIGS. 23A and 23B, the cage is modified to include six male power posts 222 (+, return) for mating with the female receptacles 216 on the optical module 210 (FIGS. 22A and 22B). The rear wall 226 further includes an opening 228 with contacts (not shown) for receiving electrical signal interface 218.

The optical module systems shown in FIGS. 10A-13 and 20A-23B and described above are examples of an optical transceiver that may be used for delivery of power and communications. As previously noted, in one or more embodiments, the optical transceiver may comprise silicon photonics. The following describes power delivery through an optical system using in-package optics (e.g., package comprising photonic chip (die, integrated circuit), ASIC (Application-Specific Integrated Circuit), electrical integrated circuit, or any other type or combination of chips, dies, and integrated circuits).

In one or more embodiments, multiple processes may be embedded into a photonic chip, for example, if a limit of the electrical ASICs is reached. In the example described below, the optics are integrated with the electrical integrated circuit (referred to as in-package optics). FIGS. 24-26B illustrate an example of in-package optics with ESP (Extended Safe Power).

Figure 24:
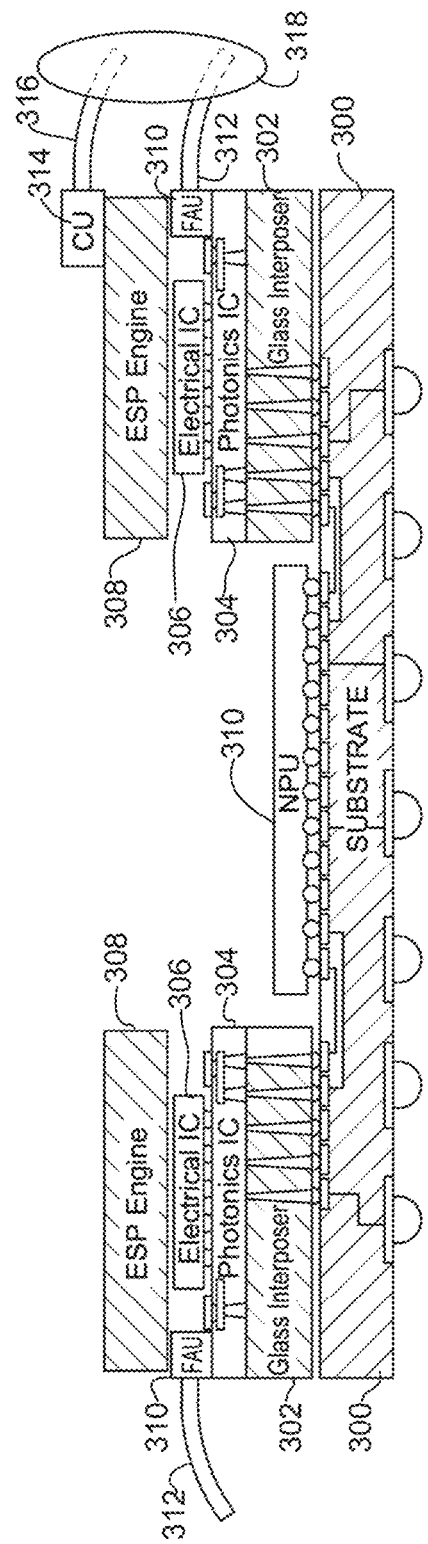
FIG. 24 is a cross-sectional perspective of an optical transceiver comprising an ESP (Extended Safe Power) engine integrated into in-package optics, in accordance with one embodiment.
Figure 25:
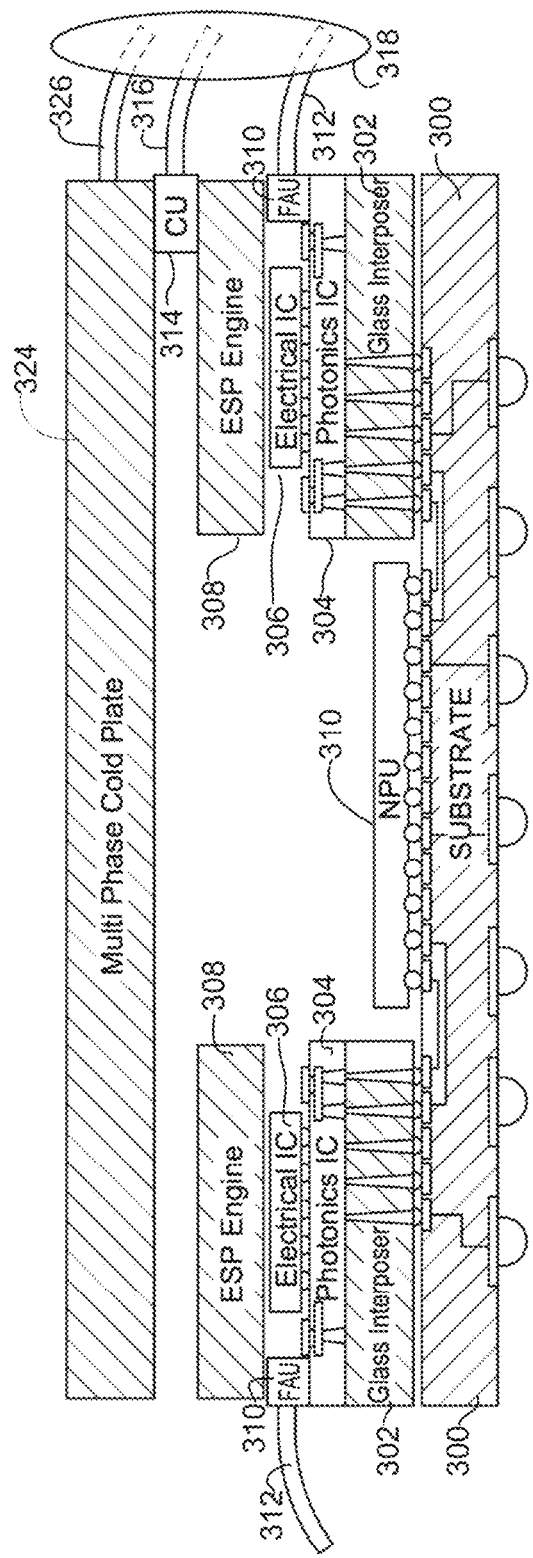
FIG. 25 is a cross-sectional perspective of the package of FIG. 24 with cooling, in accordance with one embodiment.

In one or more embodiments, an apparatus comprises a substrate 300, a die 310 mounted on the substrate, at least one photonic chip 304 in communication with the die, and at least one electrical device 306, 308 for receiving or transmitting pulse power (FIG. 24). The photonic chip 304 is configured for connection with at least one optical fiber 312 in a power and optical fiber cable 318 and the electrical device 308 is configured for connection with at least one electrical wire 316 in the power and optical fiber cable.

As shown in the cross-sectional schematic of FIG. 24, a package includes an ASIC (e.g., switch ASIC, NPU (Network Processing Unit), chip, die) 310, silicon photonics integrated circuits 304 with fiber optic links (FAUs (Fiber Array Units) 310 connecting directly into the assembly, electrical integrated circuits 306, and ESP engines 308 (e.g., integrated circuits operable to perform extended safe power functions described herein) mounted on a substrate 300 (e.g., electrical board, ceramic board, or an element formed from any other suitable material). The NPU 310 (or other die, chip, integrated circuit) is attached to the substrate 300. In this example, the photonics integrated circuits 304 are coupled to the substrate 300 through glass interposers 302. The substrate 300 may comprise traces and pads embedded within or deposited on the substrate for connection with the NPU 310 and glass interposers 302. Etching, deposition, bonding, or other processes may be used to form the traces and pads, as is well known by those skilled in the art. The FAUs 310 are directly attached to the photonics integrated circuit 304 (e.g., fiber connection along chip periphery edge) and a copper connector 314 is directly attached to the ESP engine 308. As previously described, one or more fibers 312 and copper wires 316 are carried together in a cable 318. For simplification, the copper wire 316 and connector 314 are only shown at one of the ESP engines 308.

As shown in FIG. 24, the cable 318 comprises one or more optical fibers 312 and one or more electrical wires 316, with the optical fiber 312 coupled to an optical component (photonic IC 304) and the electrical wire 316 coupled to power and electrical communications components (ESP engine 308). The fiber and copper attachments (FAU (Fiber Attachment (Array) Unit), CAU (Copper Attachment (Array) Unit) may be configured for attachment to any number of electrical wires or optical fibers.

In one or more embodiments, the cable 318 may further comprise one or more cooling lines 326 coupled to a cold plate 324 (e.g., multi-phase cold plate or another suitable cooling device) operable to cool components of the package, as shown in FIG. 25. A thermal conductor (interposer) may also be positioned on top of the NPU 310 or other components, for example.

It is to be understood that the in-package optics (electronic and optical package) shown in FIGS. 24 and 25 are only examples and the package may comprise one or more integrated circuit, ASIC, NPU, MCM (Multi-Chip Module), die, chip, chiplet, processor, photonics integrated circuit (chip, die), or electronic component attached to one or more substrates. The term "optical module," "optical transceiver,"

or "network transceiver" as used herein may refer to the package comprising the photonics integrated circuit 304, electrical integrated circuit 306, and ESP engine 308.

Figure 26A:
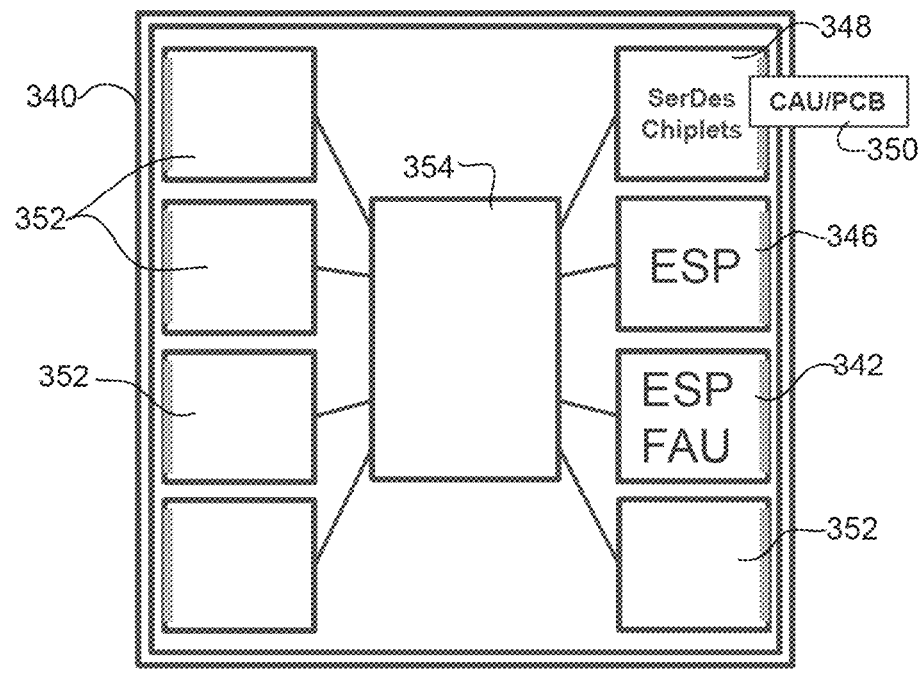
FIG. 26A is a block diagram illustrating chips that may be included in the package, in accordance with one embodiment.
Figure 26B:
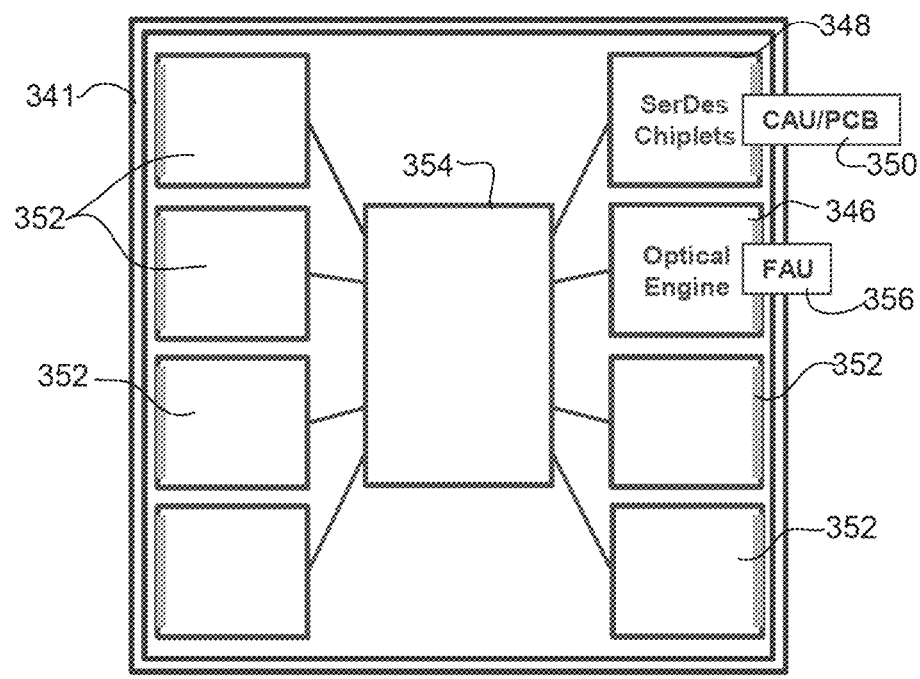
FIG. 26B is a block diagram illustrating chips that may be included in the package, in accordance with another embodiment.

FIGS. 26A and 26B are block diagrams illustrating a plurality of chips (chiplets) coupled through a central chip 354. FIG. 26A illustrates a first package 340 comprising an ESP chip (photonics IC) (with FAU) 342, ESP chip (electrical IC) 346, and a SerDes (serializer/deserializer) chiplet 348 coupled to a CAU (Copper Array Unit) or PCB (Printed Circuit Board) 350. The package may comprise any other number or configuration of chips 352. FIG. 26B shows a hybrid package 341 comprising one or more of the SerDes chiplets 348 and one or more optical engine 346 with FAU 356. It is to be understood that these are only examples and the package may comprise any number or type of chips, chiplets, die, and FAU and CAU attachments in any arrangement.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. An apparatus comprising:
a connector for coupling a cable comprising at least one optical fiber and at least one electrical wire to an optical module at a network communications device, the connector comprising:
an electrical contact plate for engagement with an electrical contact on the optical module; and
a ferrule into which the at least one optical fiber is inserted,
wherein the electrical contact plate is configured for electrically coupling said at least one electrical wire to the electrical contact on the optical module for delivery of power through the optical module.

2. The apparatus of claim 1, wherein the electrical contact plate is an external contact plate.

3. The apparatus of claim 1, wherein the connector is operable to deliver pulse power from said at least one electrical wire to the electrical contact or from the electrical contact to said at least one electrical wire.

4. The apparatus of claim 1, wherein the connector further comprises a crimp point for crimping said at least one electrical wire to the electrical contact plate.

5. The apparatus of claim 1, wherein the connector comprises a plurality of electrical contact plates for engagement with a plurality of electrical contacts on the optical module, and wherein the plurality of electrical contact plates are configured for electrically coupling electrical wires in the cable to the plurality of electrical contacts on the optical module for delivering multi-phase pulse power.

6. The apparatus of claim 5, wherein said plurality of electrical contact plates comprise a plurality of copper pads, each of the plurality of copper pads positioned on a different external side wall of the connector.

7. The apparatus of claim 5, wherein the connector comprises three electrical contact plates for engagement with three electrical contacts on the optical module, and wherein the three electrical contact plates are configured for electrically coupling electrical wires in the cable to the three electrical contacts on the optical module for delivering three-phase pulse power.

8. The apparatus of claim 7, wherein the three electrical contact plates are positioned on three of four sides of the connector, a fourth side of the connector comprising a latch mechanism for securing the connector in the optical module.

9. The apparatus of claim 1, wherein the connector further comprises a spring loaded slide cover for covering the electrical contact plate, and wherein the optical module comprises a post for moving the spring loaded slide cover and exposing the electrical contact plate when the connector is inserted into the optical module.

10. The apparatus of claim 1, wherein the power comprises pulse power comprising a plurality of voltage pulses defining alternating high voltage states and low voltage states.

11. The apparatus of claim 10, wherein said at least one electrical wire comprises at least two electrical wires and the power comprises at least two phases with the plurality of voltage pulses offset between phases to provide continuous power.

12. The apparatus of claim 1, further comprising the optical module having an opening for receiving the connector, wherein an end of the optical module opposite said opening comprises a power connector for transferring the power to or from the network communications device and an electrical signal interface for transmitting or receiving data.

13. The apparatus of claim 1, further comprising the cable, wherein said at least one electrical wire is crimped on to the electrical contact plate and said at least one optical fiber is inserted into the ferrule.

14. A method comprising:
coupling a cable comprising at least one optical fiber and at least one electrical wire, to an optical module at a network communications device by:
electrically coupling, via an electrical contact plate of a connector, the at least one electrical wire to an electrical contact on the optical module for delivery of power through the optical module; and
inserting the at least one optical fiber into a ferrule of the connector for transmitting communications.

15. The method of claim 14, further comprising:
delivering pulse power between the at least one electrical wire and the electrical contact.

16. The method of claim 14, further comprising:
crimping, at a crimp point, the at least one electrical wire to the electrical contact plate.

17. The method of claim 14, wherein electrically coupling the at least one electrical wire to the electrical contact on the optical module comprises:
electrically coupling, via a plurality of electrical contact plates, a plurality of electrical contacts on the optical module with a plurality of electrical wires in the cable, for delivering multi-phase pulse power.

18. An assembly comprising:
a cable having at least one optical fiber and at least one electrical wire;
an optical module having an electrical component configured to transmit power over the cable and an optical component configured to engage in optical communications over the cable; and
a connector for coupling the cable to the optical module, wherein the connector comprises:
a plurality of electrical contact plates that are configured to engage with a plurality of electrical contacts on the optical module, and
a ferrule configured to receive the at least one optical fiber for communications, wherein the plurality of electrical contact plates are configured for electrically coupling electrical wires in the cable to the plurality of electrical contacts on the optical module for delivering a multi-phase pulse power.

19. The assembly of claim 18, wherein the connector is configured to deliver pulse power from said at least one electrical wire to the electrical contact or from the electrical contact to said at least one electrical wire.

20. The assembly of claim 18, wherein the connector further comprises a crimp point configured to crimp said at least one electrical wire to the electrical contact plate.

* * * * *